United States Patent
Kim et al.

(10) Patent No.: US 10,891,363 B2
(45) Date of Patent: Jan. 12, 2021

(54) USER AUTHENTICATING METHOD AND DEVICE

(71) Applicant: SAMSUNG ELECTRONICS CO., LTD., Suwon-si (KR)

(72) Inventors: Eun-ah Kim, Seoul (KR); Hee-kwan Lee, Seongnam-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 300 days.

(21) Appl. No.: 15/741,059

(22) PCT Filed: Jun. 24, 2016

(86) PCT No.: PCT/KR2016/006750
§ 371 (c)(1),
(2) Date: Dec. 29, 2017

(87) PCT Pub. No.: WO2017/003136
PCT Pub. Date: Jan. 5, 2017

(65) Prior Publication Data
US 2018/0189470 A1    Jul. 5, 2018

(30) Foreign Application Priority Data
Jul. 1, 2015 (KR) .................. 10-2015-0094007

(51) Int. Cl.
*G06F 21/34* (2013.01)
*G06F 21/45* (2013.01)
*G06F 21/31* (2013.01)

(52) U.S. Cl.
CPC .......... *G06F 21/34* (2013.01); *G06F 21/316* (2013.01); *G06F 21/45* (2013.01)

(58) Field of Classification Search
CPC ......... G06F 21/34; G06F 21/316; G06F 21/45
See application file for complete search history.

(56) References Cited

U.S. PATENT DOCUMENTS 7,647,638 B2    1/2010 Furuyama
8,863,261 B2    10/2014 Yang
(Continued)

FOREIGN PATENT DOCUMENTS

CN    1612081 A    5/2005
CN    104580091 A    4/2015
(Continued)

OTHER PUBLICATIONS

Communication dated Nov. 4, 2019, issued by the Korean Intellectual Property Office in corresponding Korean Application No. 10-2015-0094007.
(Continued)

*Primary Examiner* — Hee K Song
(74) *Attorney, Agent, or Firm* — Sughrue Mion, PLLC

(57) ABSTRACT

Provided is an authentication method including receiving an authentication request; obtaining authentication data for authenticating a user from at least one of a plurality of external devices as when the authentication request is received; obtaining an authentication score based on the obtained authentication data and reliability information assigned to a type of the authentication data in advance; and determining whether additional authentication is necessary based on the obtained authentication score.

16 Claims, 17 Drawing Sheets

(56) References Cited

U.S. PATENT DOCUMENTS

| | | | |
|---|---|---|---|
| 9,129,723 B2* | 9/2015 | Wasynczuk | H01B 1/02 |
| 9,426,139 B1* | 8/2016 | McClintock | H04L 63/08 |
| 9,721,080 B2* | 8/2017 | Moran | G06F 21/32 |
| 10,008,061 B2* | 6/2018 | Klink | H04W 12/04 |
| 10,303,869 B1* | 5/2019 | Duke | G06F 21/36 |
| 10,616,196 B1* | 4/2020 | Khitrenovich | H04L 63/08 |
| 2007/0290797 A1* | 12/2007 | Harkins | G07C 9/00103 340/5.73 |
| 2013/0055370 A1* | 2/2013 | Goldberg | G06F 21/31 726/7 |
| 2013/0167215 A1 | 6/2013 | Yang | |
| 2014/0068726 A1* | 3/2014 | Jakobsson | G06F 21/31 726/5 |
| 2014/0289822 A1* | 9/2014 | Wilson | G06Q 20/42 726/5 |
| 2015/0107316 A1* | 4/2015 | Kirkjan | G07C 9/00309 70/275 |
| 2015/0199863 A1* | 7/2015 | Scoggins | G07C 9/00904 340/5.25 |
| 2015/0227926 A1* | 8/2015 | Grigg | G06Q 20/32 705/64 |
| 2016/0049027 A1* | 2/2016 | Soldner | G07C 9/00174 340/5.61 |
| 2016/0135046 A1* | 5/2016 | John Archibald | H04W 12/06 455/411 |
| 2016/0147987 A1 | 5/2016 | Jang et al. | |
| 2016/0182491 A1* | 6/2016 | Jia | H04L 63/08 726/1 |
| 2016/0350761 A1* | 12/2016 | Raziel | G06Q 20/40145 |
| 2017/0109509 A1* | 4/2017 | Baghdasaryan | H04L 63/08 |
| 2018/0336748 A1* | 11/2018 | Rais | E05B 47/0676 |

FOREIGN PATENT DOCUMENTS

| | | |
|---|---|---|
| JP | 2003-186836 A | 7/2003 |
| KR | 2003-0030083 A | 4/2003 |
| KR | 10-2008-0019833 A | 3/2008 |
| KR | 10-2008-0092789 A | 10/2008 |
| KR | 10-2010-0004570 A | 1/2010 |
| KR | 10-2014-0076082 A | 6/2014 |
| KR | 10-2015-0011046 A | 1/2015 |

OTHER PUBLICATIONS

Communication dated Dec. 30, 2019, from the State Intellectual Property Office of People's Republic of China in counterpart Application No. 201680039378.X.

International Search Report dated Oct. 20, 2016, issued by the International Search Authority in counterpart International Application No. PCT/KR2016/006750 (PCT/ISA/210).

Written Opinion dated Oct. 20, 2016, issued by the International Search Authority in counterpart International Application No. PCT/KR2016/006750 (PCT/ISA/237).

Communication dated Jul. 21, 2020 issued by the State Intellectual Property Office of P.R. China in counterpart Chinese Application No. 201680039378.X.

* cited by examiner

FIG. 10

| AUTHENTICATION DATA TYPE | RELIABILITY |
|---|---|
| FACE RECOGNITION | 50 |
| VOICE | 10 |
| BODY WEIGHT | 5 |
| IRIS | 50 |
| FINGERPRINT | 30 |
| AUTOMOBILE AUTHENTICATION RESULT | 20 |
| ENTRANCE DOOR-LOCK AUTHENTICATION RESULT | 10 |
| PC LOG-IN INFORMATION | 5 |
| USER RECOGNITION PATTERN INFORMATION | 30 | ns
USER AUTHENTICATING METHOD AND DEVICE

TECHNICAL FIELD

The present invention relates to a method and an apparatus for user authentication, and more particularly, to a method and an apparatus for performing user authentication by using various devices.

BACKGROUND ART

Generally, authentication methods are difficult and complex with respect to maintaining security. However, since Internet of Things (IoT) technology is gradually expanding, there is a need to develop a convenient and simple authentication method using IoT.

FIG. 1 is a diagram showing an authentication method of a device in the related art. Referring to FIG. 1, a door-lock device 10 stores a predetermined password through a registration procedure. In order for a user to perform authentication, a password is input to the door-lock device 10, and the door-lock device 10 authenticates the user by comparing the stored password with the password input by the user. However, the door-lock device 10 cannot receive data other than a password from the user. Even when other data is input, the door-lock device 10 cannot perform authentication by using the other data.

An automobile 20 of FIG. 1 is also only capable of performing user authentication by using a car key, and it is difficult to perform user authentication by using other data.

In other words, according to the related art, there are various types of data that may be used for user authentication, such as a password, an image, a voice, and a fingerprint, but authentication-performing devices may receive only pre-set types of data. Therefore, there is inconvenience in that the user has to input only pre-set types of data according to the device performing the authentication. Furthermore, since a security level is determined according to performance of an authentication device, there is a problem in that the security level may be lowered.

DETAILED DESCRIPTION OF THE PRESENT INVENTION

Technical Problem

The present invention provides a convenient and safe authentication method and an authentication device.

Technical Solution

Embodiments of the present invention provide an authentication method including receiving an authentication request; obtaining authentication data for authenticating a user from at least one of a plurality of external devices when the authentication request is received; obtaining an authentication score based on the obtained authentication data and reliability information assigned to a type of the authentication data in advance; and determining whether additional authentication is necessary based on the obtained authentication score.

The method may further include receiving information regarding an authentication result from the at least one of the plurality of external devices, wherein, in the obtaining of the authentication score, the authentication score may be obtained by using the received information regarding an authentication result.

The external device may include a device for collecting information and a device capable of performing authentication.

The determining of whether additional authentication is necessary may further include determining an authentication method for the additional authentication when the authentication score is less than or equal to a threshold score.

The determining of the authentication method may include determining at least one external device to use for the additional authentication, and the at least one external device may be determined based on a distance to a user, a pre-set preference of the user, a frequency of using the at least one external device, reliability information assigned to the type of authentication data obtainable from the at least one external device, or an input of the user.

The determining of the authentication method may include determining a type of authentication data to obtain by using the at least one external device and an order of obtaining the authentication data.

The method may further include requesting the determined external device for additional authentication; and obtaining the additional authentication data in response to the request.

The method may further include obtaining reference data from the user; storing the obtained reference data; determining whether additional reference data is necessary; and obtaining additional reference data from the user based on a result of the determining.

The obtaining of the authentication score may include comparing the stored reference data to the obtained authentication data; and calculating the authentication score based on a result of the comparing.

The method may further include updating stored reference data by using the obtained authentication data.

The updating may include, when the authentication score is equal to or greater than a threshold score, comparing the obtained authentication data to the stored reference data; and selectively updating the stored reference data with the obtained authentication data based on a result of the comparison.

The authentication data may include recognition pattern information for identifying the user.

The recognition pattern information may include information periodically obtained from the external device.

The threshold score may be determined according to at least one of the number of received authentication requests, a result of analyzing the authentication data, the number of external devices connected to the authentication device, and a cumulative number of authentication successes.

In the determining of the authentication method, the authentication method may be determined to request at least one external device for authentication data a predetermined number of times or more when the obtained authentication score is a predetermined score less than or equal to the threshold score.

Embodiments of the present invention provide a computer readable recording medium having recorded thereon a computer program for implementing the method.

Embodiments of the present invention provide an authentication device including a signal obtaining unit configured to receive an authentication request; a communication unit configured to, obtains authentication data for authenticating a user from at least one of a plurality of external devices when the authentication request is received; and a processor configured to obtain an authentication score based on the obtained authentication data and reliability information assigned to a type of the authentication data in advance and determine whether additional authentication is necessary based on the obtained authentication score.

The communication unit may receive information regarding an authentication result from at least one of the plurality of external devices, and the processor may obtain the authentication score by using the received information regarding an authentication result.

The external device may include a device for collecting information and a device capable of performing authentication.

The processor may determine an authentication method for the additional authentication when the authentication score is less than or equal to a threshold score.

The processor may determine at least one external device to use for the additional authentication, and the at least one external device may be determined based on a distance to a user, a pre-set preference of the user, a frequency of using the at least one external device, reliability information assigned to the type of authentication data obtainable from the at least one external device, or an input of the user.

The processor may determine a type of authentication data to obtain by using the at least one external device and an order of obtaining the authentication data.

The communication unit may request the determined external device for additional authentication and obtain the additional authentication data in response to the request.

The device may further include a user input unit configured to obtain reference data from the user; and a storage unit configured to store reference data obtained from the user, wherein the processor may be configured to determine whether it is necessary to store additional reference data.

The processor may compare the stored reference data to the obtained authentication data and calculate the authentication score based on a result of the comparison.

The processor may update stored reference data by using the obtained authentication data.

When the authentication score is equal to or greater than a threshold score, the processor may compare the obtained authentication data to the stored reference data and selectively update the stored reference data with the obtained authentication data based on a result of the comparison.

The authentication data may include recognition pattern information for identifying the user.

The recognition pattern information may include information periodically obtained from the external device.

The threshold score may be determined according to at least one of the number of received authentication requests, a result of analyzing the authentication data, the number of external devices connected to the authentication device, and the cumulative number of authentication successes.

The processor may determine an authentication method to request at least one external device for authentication data a predetermined number of times or more when the obtained authentication score is a predetermined score less than or equal to the threshold score.

DESCRIPTION OF THE DRAWINGS

FIG. 10 is a diagram showing reliability according to types of authentication data, the reliability being used for calculating an authentication score, according to some embodiments. According to some embodiments, an authentication device may obtain authentication data and calculate an authentication score based on reliability information that is assigned to the type of the authentication data in advance.

BEST MODE

Figure 1:
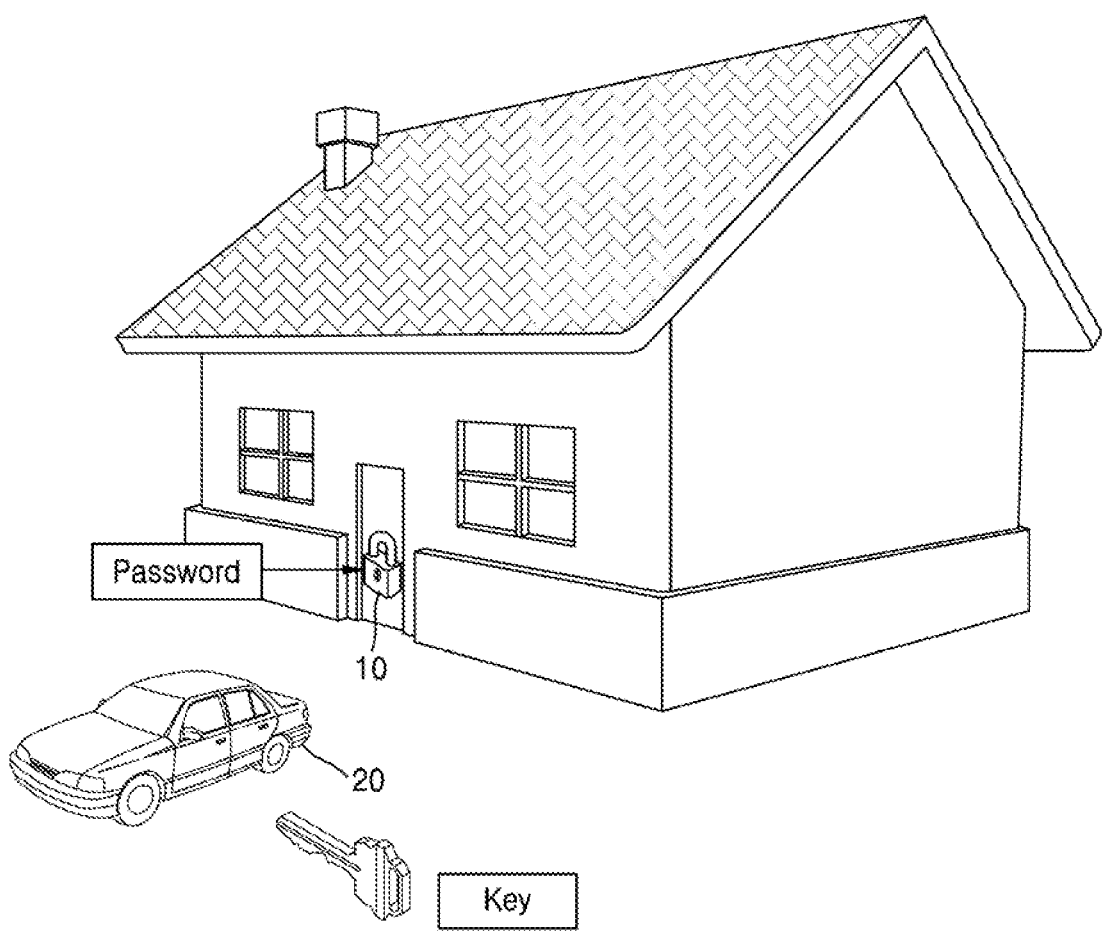
FIG. 1 is a diagram showing an authentication method of a device in the related art.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components. In addition, the terms "-er", "-or", and "module" described in the specification mean units for processing at least one function and operation and can be implemented by hardware components or software components or combinations thereof.

Throughout the specification, authentication refers to a series of operations for identifying of a predetermined authentication target, such as a user, for services including physical unlocking, login, an online transaction, and a computer system and determining whether the user is a registered user or a duly authorized target for maintaining system security. However, the present invention is not limited thereto.

Throughout the specification, an authentication device refers to a device capable of performing authentication, may include a personal computer, a mobile phone, a smart phone, a TV, a tablet, a laptop computer, a personal digital assistant (PDA), a portable multimedia player (PMPs), a navigation device, an MP3 player, a digital camera, a refrigerator, a washing machine, and a cleaner, is not limited thereto, and may include various devices, such as a consumer electronics (CE) device (e.g., a door-lock device, a refrigerator, a washing machine, a cleaner, etc.), a wearable device, an audio input/output device like a microphone and a speaker, various sensors, and a network storage device. Furthermore, the authentication device may be a device included in a predetermined device.

Throughout the specification, an external device may include not only a device capable of performing an authentication method, but also an apparatus that is not capable of performing an authentication method. In other words, an external device may include all devices and may include an external server.

Throughout the specification, a communication technique may include all communication techniques for communication using a predetermined communication standard, a predetermined frequency band, a predetermined protocol, or a predetermined channel. For example, the communication technique may include Bluetooth, BLE, Wi-Fi, Zigbee, 3G, LTE, a communication technique using ultrasound, etc., and may include short-range communication, long-range distance communication, wireless communication, and wired communication. Of course, the present invention is not limited thereto.

Throughout the specification, the short-range communication technique may refer to a communication technique capable of communicating only when two devices are within a predetermined range and may refer to a method of performing a direct communication between two devices. For example, the short-range communication technique may include Bluetooth and NFC, and is not limited thereto.

Throughout the specification, the long distance communication technique may refer to a communication technique that two devices can communicate regardless of distance. For example, the long-distance communication technique may refer to a technique that two devices can communicate with each other through a repeater, such as an AP, even when a distance between the two devices is equal to or greater than a predetermined distance and may include a communication technique using a cellular network, such as an SMS or a telephone. Of course, the present invention is not limited thereto, and the long distance communication technique may include all communication techniques other than the short-distance communication technique.

Throughout the specification, authentication data refers to data used for authentication. For example, authentication data includes authentication information based on biometric information of a user (e.g., image data regarding iris recognition, fingerprint recognition, and a face of the user and sound data like a voice, and a body weight), authentication data based on information remembered by the user (e.g., a password, a PIN number, etc.) and authentication data based on a device owned by the user (e.g., an OTP, a mobile phone, a security card, etc.). Of course, the present invention is not limited thereto.

Throughout the specification, reference data may refer to data stored in an authentication device for authentication. In other words, the reference data may include data that becomes a reference when compared to authentication data for determining whether an authentication target, such as a user, is an allowed target. Furthermore, the reference data may include the same type of data as the authentication data described above.

Throughout the specification, an authentication target may refer to a user who, from among at least one user, became a target to be authenticated by an authentication device by transmitting an authentication request to the authentication device.

Figure 2:
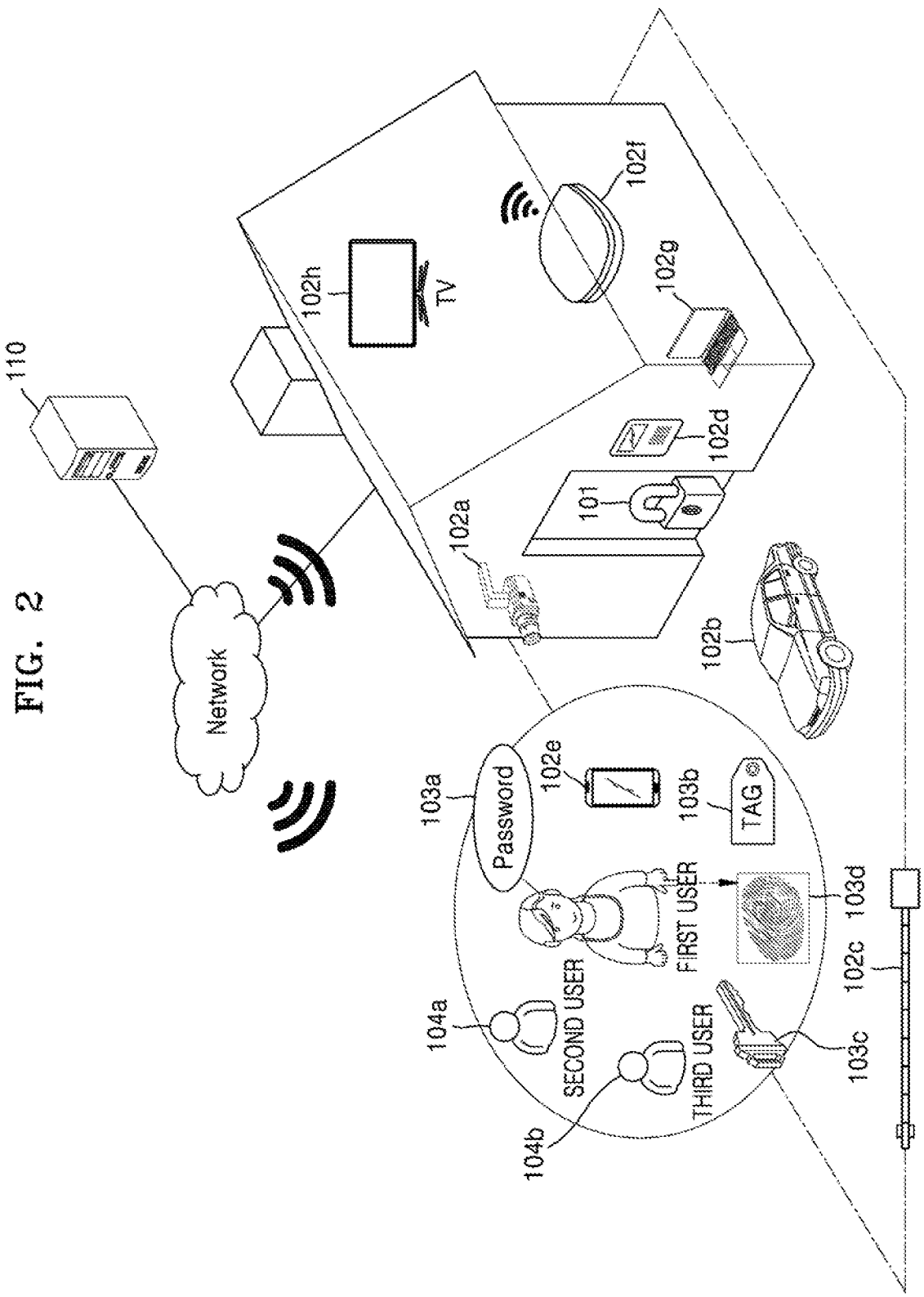
FIG. 2 is a diagram showing an authentication system according to some embodiments.

FIG. 2 is a diagram showing an authentication system according to some embodiments.

Referring to FIG. 2, an authentication device 101 is connected to at least one of external devices 102a through 102h.

According to some embodiments, the authentication device 101 may be connected to at least one of the external devices 102a through 102h using a secure communication channel. For example, the authentication device 101 may perform a secure communication with at least one of the external devices 102a through 102h by using a public key or a symmetric key. Furthermore, the authentication device 101 may be connected to at least one of the external devices 102a through 102h via a short-range communication or the Internet. Furthermore, the authentication device 101 may be connected to at least one of the external devices 102a through 102h via a home network. However, the present invention is not limited thereto.

Furthermore, according to some embodiments, the authentication device 101 and at least one external device may be connected to an external server 110. The external server 110 may include an authentication server, a service server, a content server, and a cloud server, but is not limited thereto.

Although FIG. 2 shows that the authentication device 101 is a door-lock device, the authentication device 101 is a device that performs authentication, and an automobile 102d or a laptop computer 102g may also be a device that performs authentication.

According to some embodiments, the authentication device 101 may register and store reference data for identifying an authentication target. For example, the authentication device 101 may store image data, voice data, identifiers, and corresponding passwords as reference data. Furthermore, the authentication device 101 may identify an authentication target by assigning different identifiers to respective authentication targets. Furthermore, the authentication device 101 may also store one or more reference data for each authentication target.

According to some embodiments, the authentication device 101 may determine a security level. The authentication device 101 may determine a security level by adjusting a threshold score, which is a level of needed authentication. The term "threshold score" may refer to a predetermined threshold value.

According to some embodiments, the authentication device 101 may obtain authentication data from at least one of the external devices 102a through 102h. Of course, the authentication device 101 may also directly obtain authentication data.

According to some embodiments, the authentication device 101 may perform authentication based on the obtained authentication data. For example, the authentication device 101 may compare stored reference data with the obtained authentication data and obtain an authentication score based on a result of the comparison. The authentication score may be calculated based on reliability information, which is information regarding reliability previously assigned to the type of the obtained authentication data.

According to some embodiments, the type of authentication data may be categorized into various types of data, such as face recognitions, irises, passwords, voices, and body weights, and reliability may vary according to the respective types. For example, voice data may have higher reliability than body weight data, and iris data may have higher reliability than password data. Information regarding reliability may be included in an authentication policy and may be set according to an authentication policy determined based on a user input or an authentication policy received from an external server 110.

According to some embodiments, the authentication device 101 may obtain authentication result information, which is information regarding a result of an authentication performed by at least one of the external devices 102a through 102h. For example, the authentication device 101 may obtain a result that the automobile 102d authenticated an authentication target. Furthermore, the authentication device 101 may obtain authentication information from the external server 110.

According to some embodiments, the authentication device 101 may transmit authentication result information to at least one of the external devices 102a through 102h or to the external server 110.

According to some embodiments, the authentication device 101 may receive an authentication request. The authentication device 101 may determine that an authentication request is received based on information detected by the authentication device 101 or at least one of the external devices 102a through 102h even when no input is received from an authentication target.

Referring to FIG. 2, an authentication target, such as a first user, may have various authentication data. For example, the authentication data may include a password 103a, an electronic tag or electronic card 103b, a key or electronic key 103c, and a fingerprint 103d, but is not limited thereto.

According to some embodiments, a second user and a third user may also be used as authentication data of an authentication target. For example, when the first user and the second user are present together, the authentication device 101 may use authentication data regarding the second user, such as an image, a voice, and an iris data, as the authentication data of the first user. Detailed description thereof will be given below with reference to FIGS. 8 and 11.

According to some embodiments, an authentication target may perform authentication by selecting at least one of the authentication device 101 and the at least one external devices 102a through 102h. Furthermore, the authentication device 101 may recommend an authentication method to an authentication target.

A device carried by a user, such as a mobile phone 102e, may be included in at least one of the external devices 102a through 102h, is a device that provides authentication data of the user carrying the mobile phone 102e to the authentication device 101, and may be categorized as authentication data.

According to some embodiments, at least one of the external devices 102a through 102h may obtain various authentication data from an authentication target. Of course, the authentication device 101 may directly obtain authentication data.

According to some embodiments, at least one of the external devices 102a through 102h may obtain recognition pattern information and provide the obtained recognition pattern information to the authentication device 101 as authentication data. The recognition pattern information may include information regarding an authentication target obtained periodically or repeatedly. For example, the mobile phone 102e may periodically and repetitively obtain information regarding a location change of a user, who is an authentication target, a altitude change of the user, a usage change of the user, and an interaction of the user with another device connected to the mobile phone 102e, thereby obtaining recognition pattern information. Of course, the present invention is not limited thereto.

According to some embodiments, the external server 110 may store and manage information regarding an authentication target. For example, the external server 110 may obtain, store, and manage reference data. Furthermore, the external server 110 may perform authentication by obtaining authentication data from the authentication device 101 or at least one of the external devices 102a through 102h and comparing the obtained authentication data with stored reference data. Furthermore, the external server 110 may transmit an authentication result to the authentication device 101 and may determine a security level. According to some embodiments, the external server 110 may perform the same function as the authentication device 101.

Additionally, according to some embodiments, the external server 110 may provide an authentication policy including an authentication algorithm and reliability information according to the type of authentication data to the authentication device 101.

Figure 3:
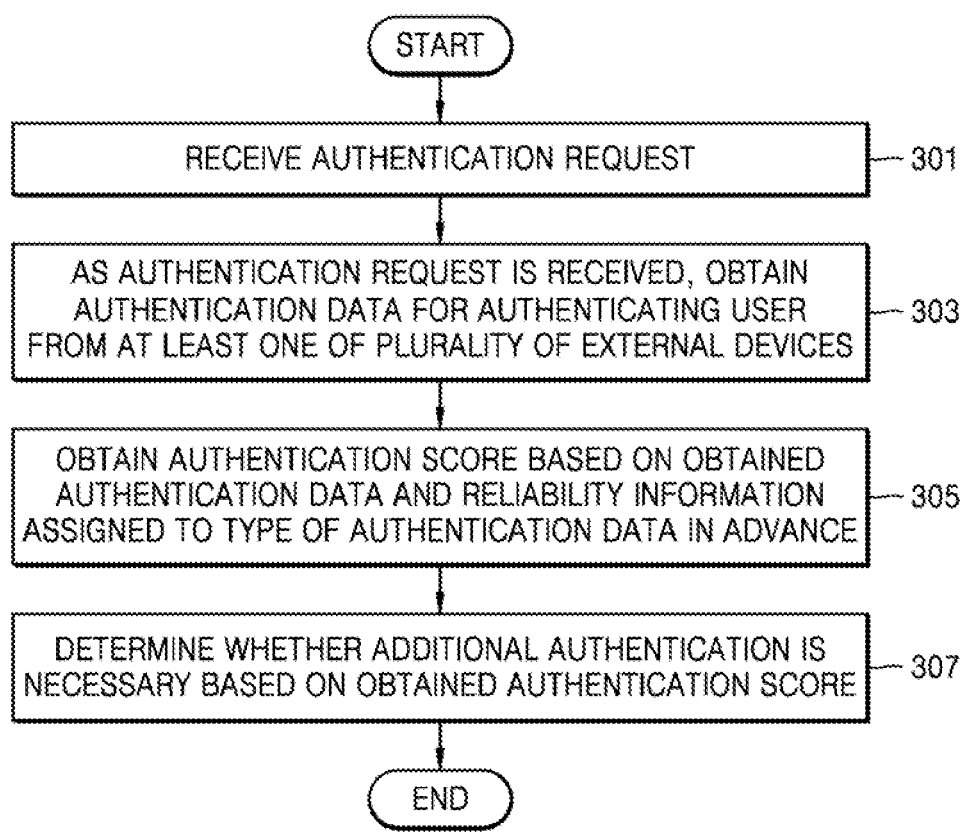
FIG. 3 is a flowchart for describing an authentication method according to some embodiments.

FIG. 3 is a flowchart for describing an authentication method according to some embodiments.

In operation 301, an authentication device may receive an authentication request.

According to some embodiments, the authentication device may receive authentication requests from an authentication target, e.g., a user. The authentication device may receive an input directly from an authentication target or may determine that an authentication request is received when an authentication target is located at a predetermined location, when an authentication target is located within a predetermined range for a predetermined time, or when an authentication target approaches toward the authentication device within a certain distance. Furthermore, the authentication device may also be configured to perform authentication at a predetermined time. Of course, the present invention is not limited thereto. In other words, when a predetermined signal is input to the authentication device, the authentication device may determine that an authentication request is received. The authentication device may also receive an authentication request received by at least one of external devices received from an authentication target.

According to some embodiments, the authentication device may obtain reference data from a user. The authentication device may register and store the obtained reference data. The authentication device may also determine when additional reference data needs to be stored. For example, the authentication device may determine whether it is necessary to store voice-related data in addition to data related to an image of an authentication target. When additional reference data needs to be stored, the authentication device may request and obtain additional reference data from an authentication target.

According to some embodiments, the authentication device may obtain various reference data from at least one of a plurality of external devices. For example, the authentication device may obtain reference data from a camera or obtain reference data from a microphone. The authentication device may also obtain reference data by receiving data stored in at least one of the plurality of external devices.

In operation 303, as an authentication request is received, the authentication device may obtain authentication data for authenticating the user from at least one of the plurality of external devices.

According to some embodiments, the authentication device may obtain various types of authentication data. For example, image data may be obtained from a camera and audio data may be obtained from a microphone. Information regarding body weight may be obtained from a scale, log-in information may be obtained from a laptop computer, and iris information and fingerprint information may be obtained from an iris recognition device and a fingerprint recognition device. Of course, the present invention is not limited thereto.

According to some embodiments, the authentication device may request authentication data from at least one of the plurality of external devices. Furthermore, according to some embodiments, the authentication device may provide obtained authentication data to at least one of the plurality of external devices.

Furthermore, according to some embodiments, the authentication device may receive information regarding results of authentications performed by the plurality of external devices. For example, a result of authentication performed by a laptop computer with respect to an authentication target may be received, or a result of authentication performed by an automobile with respect to an authentication target may be received. As described above, authentication data may include information regarding authentication results.

In operation 305, the authentication device may obtain an authentication score based on obtained authentication data and reliability information assigned to the type of the authentication data in advance.

According to some embodiments, the authentication device may compare stored reference data with the authentication data obtained in operation 303. When reference data corresponding to the obtained authentication data is not stored, the authentication device may determine that authentication has failed.

According to some embodiments, reliability may be assigned to the type of authentication data in advance. For example, reliability for each of the authentication data may be determined in advance, e.g., 20 points for face recognition information, 50 points for iris recognition information, and 5 points for voice. In other words, reliability information may be information regarding weights with respect to reliability of authentication data.

According to some embodiments, the authentication device may calculate an authentication score based on reliability information. The authentication device may calculate an authentication score of the authentication target based on the reliability information, which is information regarding the reliability of the authentication data obtained in operation 303. An authentication score may be calculated differently depending on authentication algorithms.

According to some embodiments, when obtained authentication data includes data regarding a plurality of users, the authentication device may calculate an authentication score by comparing reference data regarding the plurality of users with the authentication data.

For example, when the authentication device obtains face recognition data corresponding to a situation in which the first user and the second user are present together as the authentication data of the first user, the face recognition data of the first user and the face recognition data of the second user are respectively compared to reference data of the first user and reference data of the second user stored in the authentication device or a device like a server and, when both the face recognition data of both the first user and the second user are identical to the reference data, the authentication device may obtain an authentication score twice as much as an authentication score in a case where only the face recognition data of the first user is identical to the reference data of the first user.

Furthermore, according to some embodiments, data regarding the second user may be stored as reference data of the first user. In other words, the second user may be an independent authentication target, but data regarding the second user may be stored as reference data of the first user or may be used as authentication data of the first user. Therefore, even when data regarding a plurality of users is included the authentication data, the authentication data may be compared to reference data of a single user only.

In operation 307, the authentication device may determine whether to perform additional authentication according to the obtained authentication score.

According to some embodiments, the authentication device may determine that additional authentication is not needed when an obtained authentication score is equal to or greater than a threshold score. For example, the authentication device may determine that an authentication result is a success when an authentication score is equal to or greater than the threshold score.

According to some embodiments, the authentication device may determine that additional authentication is needed when the obtained authentication score is below the threshold score. When the authentication device determines that additional authentication is needed, the authentication device may determine an authentication method for additional authentication.

According to some embodiments, the authentication device may determine an authentication method for additional authentication based on information regarding a distance to an authentication target. According to some embodiments, the authentication device may determine an authentication method based on a distance between an authentication target and the authentication device or respective distances between an authentication target and a plurality of external devices. For example, the authentication device may determine an authentication method to perform additional authentication by using an external device closest to a user.

According to some embodiments, the authentication device may determine an authentication method for additional authentication based on the pre-set preference of a user or a frequency of using an external device. For example, when a user, who is the authentication target, most frequently uses a PC or when the user selects the PC as the most preferred authentication device, the authentication device may perform additional authentication by using the PC.

The authentication device may also determine an authentication method for additional authentication based on the type of authentication data that may be obtained from an external device, an obtained authentication score, reliability information, or a user input. For example, when image data has already been obtained, the authentication device may perform additional authentication via a microphone to obtain voice data. Furthermore, the authentication device may determine an additional authentication method based on a difference between a obtained authentication score and a threshold score, the type of authentication data to be obtained, and reliability information allocated to the authentication data in advance.

Determination of an additional authentication method may include determination of the type of authentication data to obtain and a sequence of obtaining authentication data. For example, the authentication device may determine the number of external devices to be used and a sequence of using the external devices to determine additional authentication.

Furthermore, the authentication device may recommend an additional authentication method to a user. For example, the authentication device may recommend either an iris recognition method or a voice recognition method. Furthermore, when the authentication device displays all available additional authentication methods, an additional authentication method may be determined as a user selects an authentication method.

Furthermore, according to a user's selection, an external device may determine an additional authentication method with a different combination or a sequence of external devices to be used for additional authentication.

For example, assuming that a threshold score is 100, and an obtained authentication score is 30, additional 70 authentication score is needed, and the additional 70 authentication score may not be obtained via a single authentication method, it is necessary for the authentication device to perform two or more authentications to obtain the additional 70 authentication score. When a voice recognition corresponding to 20 points of reliability is selected first based on a user input, the authentication device may determine an additional authentication method to further perform an iris recognition method corresponding to 50 points of reliability. Furthermore, when a user primarily selects a fingerprint recognition corresponding to 30 points of reliability, an additional authentication method may be selected by selecting one authentication method corresponding to 40 points of reliability or two authentication methods corresponding to 20 points of reliability each.

The authentication device may also request additional authentication data to at least one external device based on the determined additional authentication method. In other words, based on the determined authentication method, at least one device selected from among a plurality of external devices may obtain additional authentication data from an authentication target, and the authentication device may receive additional authentication data obtained by the at least one device selected device among the plurality of external devices.

According to some embodiments, the authentication device may update the stored reference data by using the obtained authentication data. According to some embodiments, when the authentication score is equal to or greater than the threshold score, the obtained authentication data may be compared with stored reference data, and the stored reference data may be updated based on a result of the comparison. Furthermore, the stored reference data may be updated periodically at a predetermined interval.

Furthermore, according to some embodiments, the authentication device may periodically obtain user information, thereby storing reference data or updating stored reference data. The user information may include all information regarding a user, e.g., images, voices, etc.

Furthermore, according to some embodiments, when information regarding an authentication result is received from at least one device from among a plurality of external devices, the authentication device may determine that the authentication result is a success and, when the authentication result is a result of authentication performed within a certain period of time, may also determine that no additional authentication is needed.

Furthermore, according to some embodiments, the authentication device may perform authentication based on recognition pattern information. In other words, recognition pattern information may also be included in authentication data. The authentication device may obtain an authentication score based on the obtained recognition pattern information and determine whether to perform additional authentication.

The authentication device may also determine a security level. According to some embodiments, the authentication device may determine a threshold score according to the number of authentication requests, results of analyzing authentication data, the number of external devices connected to the authentication device, and the cumulative number of authentication successes.

Figure 4:
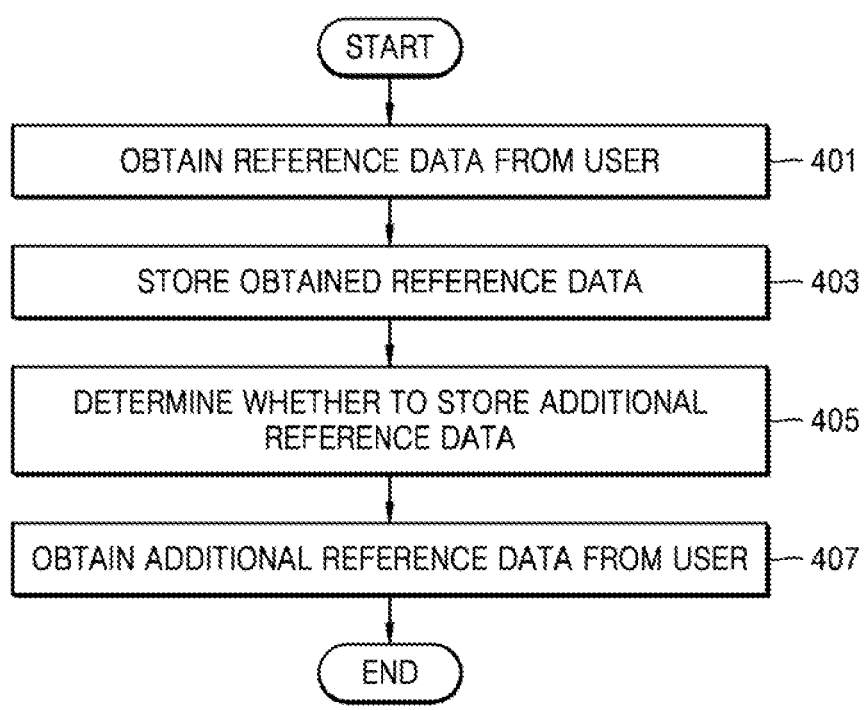
FIG. 4 is a diagram showing a method by which an authentication device registers reference data, according to some embodiments.

FIG. 4 is a diagram showing a method by which an authentication device registers reference data, according to some embodiments.

In operation 401, the authentication device may obtain reference data from a user.

According to some embodiments, the authentication device may register reference data for authentication. The authentication device may obtain reference data by using at least one of a plurality of external devices or the authentication device may directly obtain reference data.

According to some embodiments, reference data may be the same type of data as authentication data. However, reference data may be stored and used as reference data by receiving data regarding an authentication target after a predetermined input for identifying the authentication target is received. For example, a process for registering reference data may correspond to a process for a user to register a password to a door-lock device or registering a fingerprint of the user to a mobile phone. However, the present invention is not limited thereto.

Furthermore, according to some embodiments, the authentication device may store data of another user related to an authentication target as reference data of the authentication target. For example, the authentication device may store an image and a voice of the second user as reference data of the first user and obtain data of the second user when authenticating the first user, thereby using the data of the second user as an authentication data of the first user. In operation 403, the authentication device may store obtained reference data.

According to some embodiments, the authentication device may manage and store reference data (according to each of authentication targets). For example, the authentication device may create a user account and manage reference data based on the created user account.

In operation 405, the authentication device may determine whether it is necessary to store additional reference data.

According to some embodiments, the authentication device may be a device that performs a plurality of authentication methods, rather than a single authentication method.

In other words, it may be necessary to store two or more types of reference data, rather than one type of reference data, for the authentication device to perform authentication. When only one type of reference data is obtained, the authentication device may determine that it is necessary to store additional reference data.

In operation 407, the authentication device may obtain additional reference data from a user.

According to some embodiments, when it is determined in operation 405 that it is necessary to store additional reference data, the authentication device may obtain additional reference data from the user. Of course, the authentication device may obtain additional reference data from at least one of a plurality of devices.

Furthermore, according to some embodiments, the authentication device may transmit obtained reference data to an external server or at least one external device. The external server or the at least one external device may manage and store reference data obtained from the authentication device. This corresponds to the reference data management of the authentication device described above in operation 401.

Figure 5:
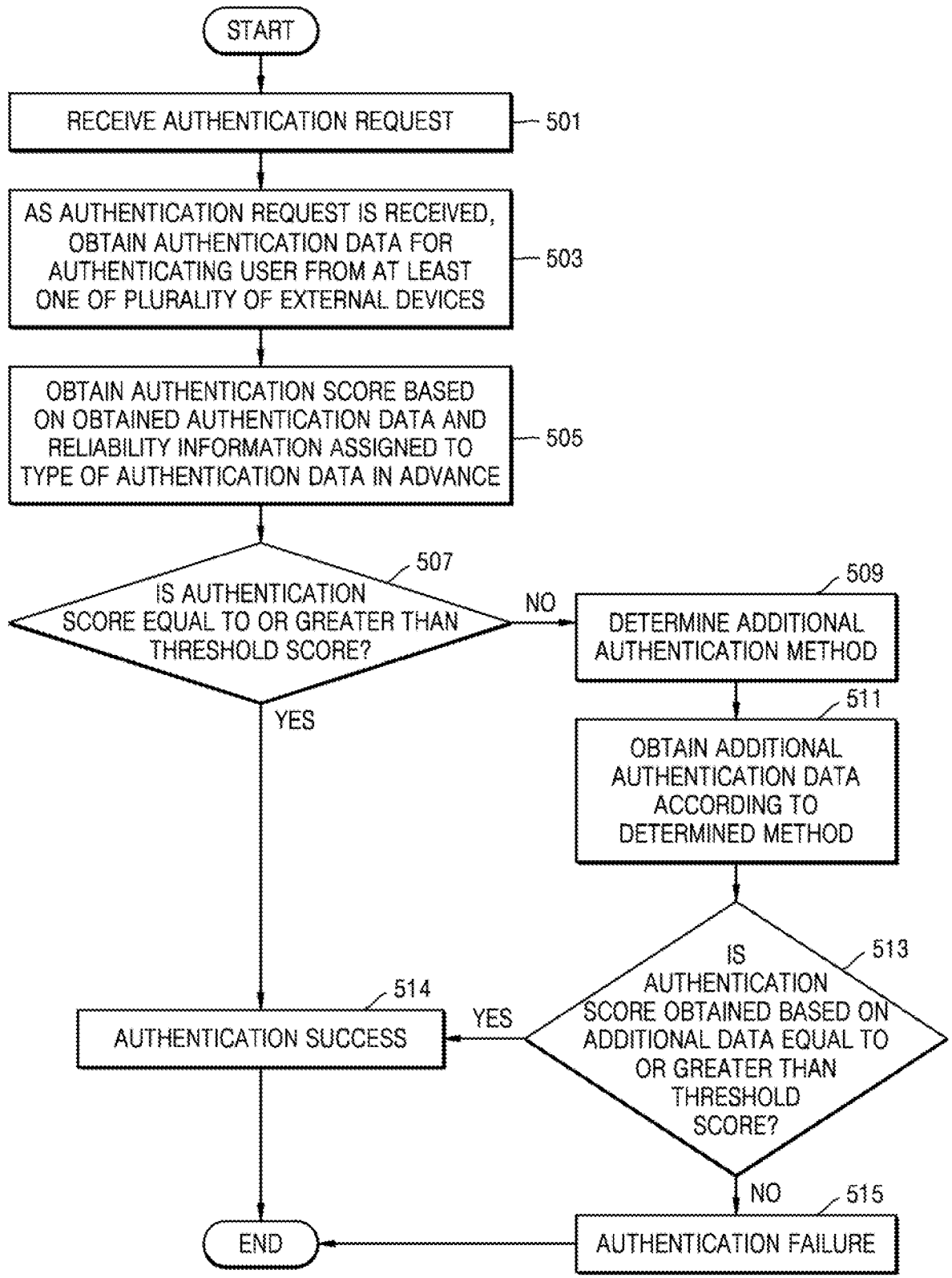
FIG. 5 is a detailed flowchart for describing an authentication method according to some embodiments.

FIG. 5 is a detailed flowchart for describing an authentication method according to some embodiments.

In operation 501, the authentication device may receive an authentication request.

In operation 503, as an authentication request is received, the authentication device may obtain authentication data for authenticating a user from at least one of a plurality of external devices. According to some embodiments, if necessary, the authentication device may transmit information for identifying an authentication target when requesting additional authentication data to the at least one of the plurality of external devices. The authentication device may communicate with the at least one of the plurality of external devices based on a pre-set shared key and a message authentication code (MAC).

In operation 505, the authentication device may obtain an authentication score based on obtained authentication data and reliability information assigned to the type of authentication data in advance. The operations 501 through 503 correspond to the operations 301 through 303 of FIG. 3, and thus detailed descriptions thereof will be omitted.

In operation 507, the authentication device may determine whether the authentication score is equal to or greater than a threshold score.

According to some embodiments, the authentication device may calculate an authentication score based on reliability information and an authentication algorithm assigned to the type of the obtained authentication data in advance and determine whether the calculated authentication score is equal to or greater than a threshold score.

According to some embodiments, the threshold score may be determined by an authentication policy determined by a user or by an authentication policy received from an external server. Furthermore, according to some embodiments, the threshold score may be determined according to at least one of the number of received authentication requests, results of analyzing authentication data, the number of external devices connected to the authentication device, and the cumulative number of authentication successes. In other words, the authentication device may dynamically determine the threshold score.

In operation 509, the authentication device may determine an additional authentication method. In other words, when the authentication score obtained in operation 507 is less than or equal to the threshold score, the authentication device may determine an additional authentication method.

According to some embodiments determination of an additional authentication method may include determination of the type of authentication data to obtain and a sequence of obtaining authentication data. For example, the authentication device may determine the number of external devices to be used and a sequence of using the external devices to determine additional authentication.

Furthermore, according to some embodiments, the authentication device may determine an additional authentication method based on an authentication distance to an authentication target, a pre-set user preference, a frequency of using an external device, type of authentication data that may be obtained from the external device, obtained authentication score, and reliability information, as described above.

According to some embodiments, the authentication device may determine a plurality of additional authentication methods and recommend the plurality of methods to a user. In other words, the authentication device may determine a plurality of authentication methods corresponding to different types of authentication data to be obtained and sequences of obtaining the authentication data and may recommend the plurality of authentication methods to a user. When the authentication device displays all available additional authentication methods, the user may choose an authentication method, thereby determining an additional authentication method.

Furthermore, according to a user selection, an external device may determine an additional authentication method with a different combination or sequence of external devices to be used for additional authentication. This corresponds to the description given above with reference to FIG. 3.

In operation 511, the authentication device may obtain additional authentication data according to the determined additional authentication method.

According to some embodiments, according to the additional authentication method determined in operation 509, at least one external device may be selected, and additional authentication data may be requested to the at least one selected external device.

According to some embodiments, if necessary, the authentication device may transmit information for identifying an authentication target when requesting additional authentication data to the at least one external devices.

In operation 513, the authentication device may determine whether an authentication score obtained based on the additional authentication data is equal to or greater than a threshold score.

According to some embodiments, the authentication device may determine whether the authentication score of the additional authentication data is equal to or greater than the threshold score by summing the authentication score obtained in operation 505 and the authentication score of the additional authentication data and may determine whether the sum of the authentication scores is greater than the threshold score based on the authentication score of the additional authentication data only. In other words, a result of determining success of an additional authentication may vary according to an authentication policy of the authentication device.

In operation 514, the authentication device may determine that an authentication result is a success. In other words, when an authentication score calculated based on additionally obtained authentication data is equal to or greater than the threshold score, the authentication device may determine that an authentication is successful.

In operation 515, the authentication device may determine that an authentication result is a failure. In other words, when an authentication score calculated based on additionally obtained authentication data is equal to or less than the threshold score, it may be determined that an authentication failed. When the authentication failed, the authentication device may perform authentication sequentially from operation 501 or may perform authentication according to the additional authentication of operation 509. Of course, the authentication device may perform a separate procedure related to authentication failure.

Figure 6:
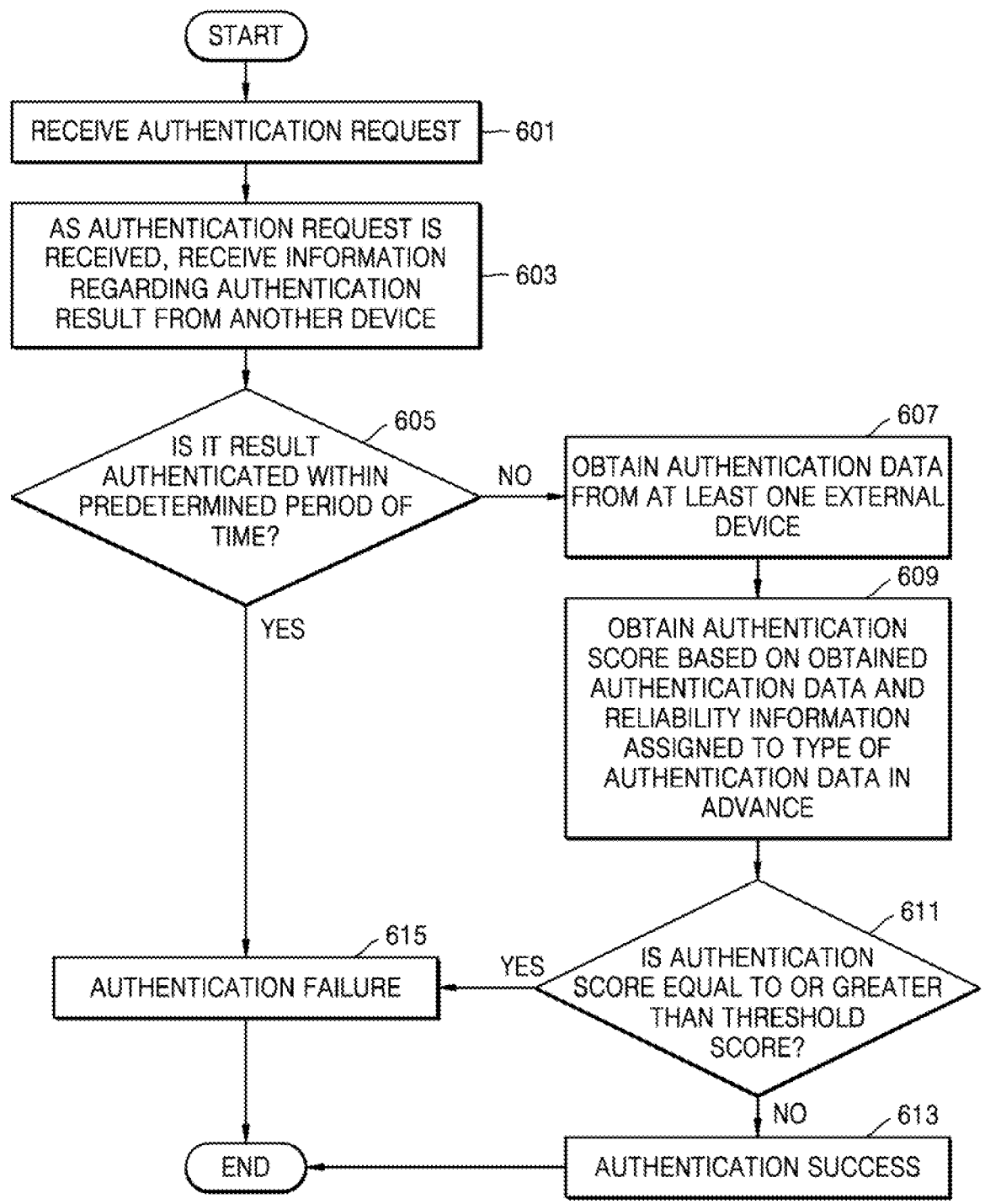
FIG. 6 is a detailed flowchart for describing another method by which an authentication device performs authentication by using an authentication result, according to some embodiments.

FIG. 6 is a detailed flowchart for describing another method by which an authentication device performs authentication by using an authentication result, according to some embodiments.

In operation 601, the authentication device may receive an authentication request, which corresponds to that described above.

In operation 603, as the authentication request is received, the authentication device may receive information regarding an authentication result from another authentication device.

According to some embodiments, an external device may include another authentication device. Therefore, the other authentication device may also perform authentication with respect to an authentication target. Since authentication data includes information regarding an authentication result, the authentication device may receive information regarding the authentication result from the other authentication device. For example, a door-lock device may receive information regarding a result of performing authentication with respect to a user from an automobile. Alternatively, the authentication device may also receive information regarding a result of performing authentication with respect to a user from an external server.

According to some embodiments, when received information regarding an authentication result indicates that an authentication has failed, the authentication device may increase a security level by increasing a threshold score.

In operation 605, the authentication device may determine whether the received information regarding an authentication result is information regarding a result of authentication performed within a predetermined period of time.

According to some embodiments, when information regarding an authentication result received from at least one external device indicates that authentication is successful, the authentication device may determined whether the received information regarding an authentication result is information regarding a result of authentication performed within a predetermined period of time. When the received information regarding an authentication result is information regarding a result of authentication performed within a predetermined period of time, the authentication device may determine that the authentication result is a success. In other words, the authentication device may determine that authentication being performed is successful.

For example, when a user returns home by an automobile, the automobile stores information regarding a result of authenticating the user by using a fingerprint and an electronic key. The door-lock device may receive the information regarding the result of authenticating the user from the automobile and may determine that the authentication result is a success.

In operation 607, the authentication device may obtain authentication data from at least one external device.

According to some embodiments, when obtained information regarding an authentication result is not a result of authentication performed within a certain period of time or there is no authentication result authenticated by another authentication device, the authentication device may obtain authentication data other than information regarding an authentication data result from at least one external device. The method by which the authentication device obtains authentication data from the at least one external device is identical to the method described above.

In operation 609, the authentication device may obtain an authentication score based on reliability information assigned to the type of authentication data in advance and obtained authentication data.

In operation 611, the authentication device may determine whether the authentication score is equal to or greater than a threshold score. Operations 609 through 611 correspond to those described above with reference to FIG. 5.

In operation 615, the authentication device may determine that an authentication result is a success. In other words, when the authentication score calculated based on additionally obtained authentication data is equal to or greater than the threshold score, the authentication device may determine that authentication is successful. Furthermore, as described above, when information regarding an authentication result received by the authentication device from another authentication device is information regarding a result of successful authentication performed within a predetermined time, the authentication device may determine that the authentication is successful.

In operation 613, the authentication device may determine that the a result of authentication is a failure. In other words, when the authentication score calculated based on the additionally obtained authentication data is equal to or less than the threshold score, the authentication device may determine that the authentication has failed.

Figure 7:
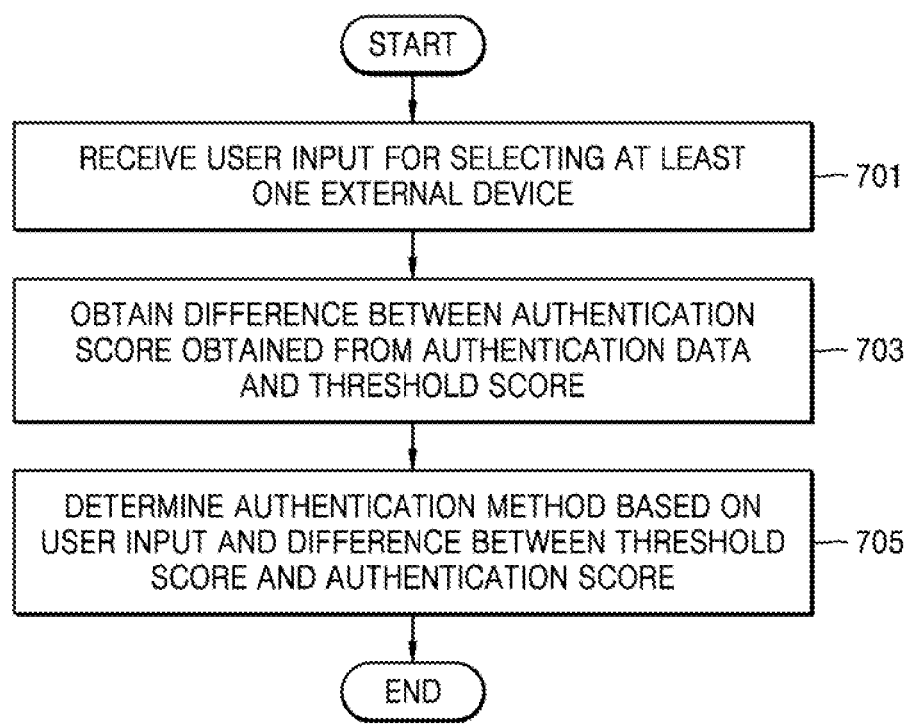
FIG. 7 is a flowchart for describing selection of an authentication method according to some embodiments.

FIG. 7 is a flowchart for describing selection of an authentication method according to some embodiments.

In operation 701, the authentication device may receive a user input for selecting at least one external device.

According to some embodiments, the authentication device may perform authentication through an external device selected according to a user input. For example, when the authentication device determines an additional authentication method, the authentication device may determine an additional authentication method by primarily taking the external device selected based on a user input into account.

In operation 703, the authentication device may obtain a difference between an authentication score obtained from authentication data and a threshold score.

As described above, the authentication device may automatically receive a authentication request and receive authentication data, which is data for performing authentication, from at least one external device without the a user input. However, when an authentication score calculated based on the authentication data obtained from the at least one external device is below a threshold score, it is necessary to perform additional authentication. However, different authentication method may be applied according to differences between the authentication score and the threshold score.

For example, when the difference between the authentication score and the threshold score is 20 points, a user may perform only one type of authentication. However, when the difference between the authentication score and the threshold score is 60 points, it may be necessary for a user to perform a plurality of types of authentications. In other words, authentication may be performed differently according to differences between the authentication score and the threshold score.

In operation 705, the authentication device may determine an authentication method based on a user input and a difference between the threshold score and the authentication score.

According to some embodiments, the authentication device may determine an additional authentication method in a different combination or sequence of external devices to be used for additional authentication, according to a user selection.

For example, when the user selects voice authentication as an authentication method, the authentication device may determine that authentication using a password via a keypad is additionally needed. However, when the user selects iris recognition, the authentication device may determine that additional authentication is unnecessary.

Figure 8:
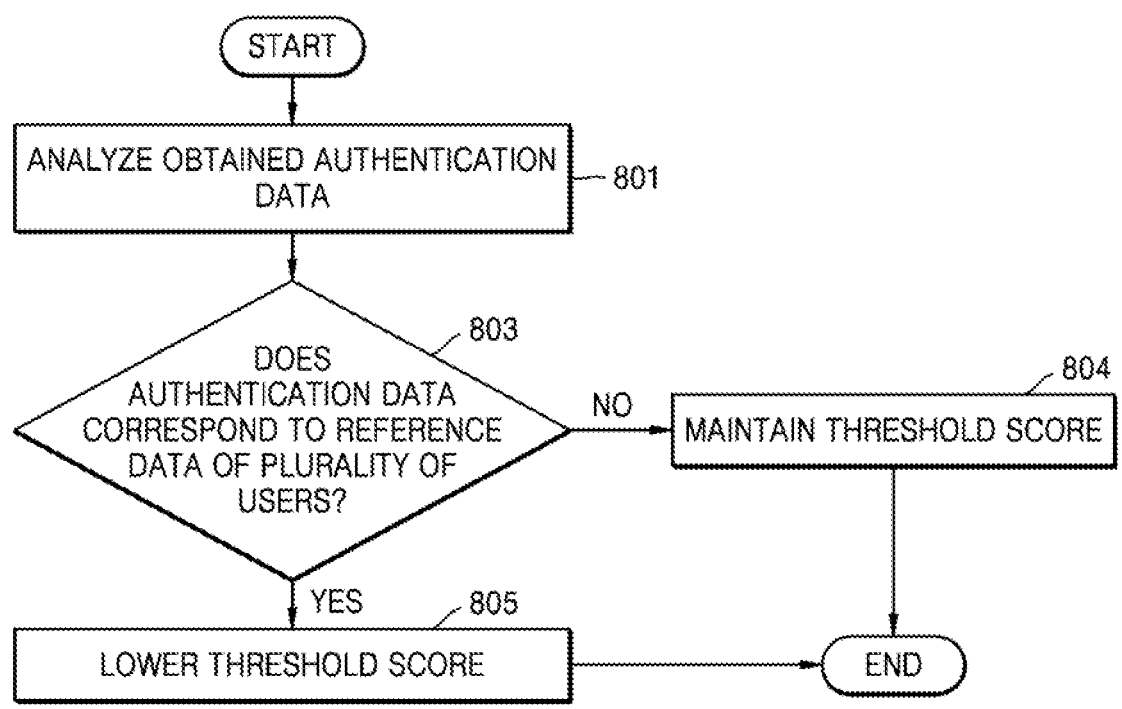
FIG. 8 is a flowchart for describing a method of determining a threshold score based on analysis of authentication data, according to some embodiments.

FIG. 8 is a flowchart for describing a method of determining a threshold score based on analysis of authentication data according to some embodiments.

In operation 801, an authentication device may analyze obtained authentication data.

According to some embodiments, the authentication device may obtain authentication data from at least one external device and analyze the obtained authentication data.

According to some embodiments, analysis of authentication data may include separation of a plurality of information elements included in the authentication data. For example, when the authentication data is a moving picture, the moving picture may be separated into frames. When the authentication data is a voice, the voice may be separated into frequency bands. Of course, the present invention is not limited thereto.

In operation 803, the authentication device may determine whether authentication data corresponds to reference data of a plurality of users.

According to some embodiments, based on a result of the analysis in operation 803, it may be determined whether the authentication data corresponds to the reference data of a plurality of users. For example, when an image received by the authentication device from a camera includes two or more users, the authentication device may analyze face regions of the two users. The authentication device may compare face region of each of the two or more users included in the image received from the camera to stored reference data based on a result of the analysis result, thereby determining whether the two or more users are included in the image. The authentication device may also determine whether voices of the two or more users are included in voice data in a similar manner. Of course, the present invention is not limited thereto, and it may also be determined whether other types of authentication data correspond to reference data of a plurality of users based on an analysis.

In operation 805, the authentication device may decrease the threshold score.

According to some embodiments, the authentication device may lower a security level when the authentication data corresponds to reference data of a plurality of users.

For example, when an authentication device obtains an image including all of family members together, the authentication device may determine that authentication is successful even when not all of set authentication methods are performed. The authentication device may also lower a threshold score only when all of users included in an image correspond to stored reference data. In other words, the authentication device may flexibly control a security level depending on situations, and the security level may be controlled differently according to an authentication policy of the authentication device.

Furthermore, according to another aspect of the present invention, when authentication data corresponds to reference data of a plurality of users, the authentication device may add an additional score to a calculated authentication score without adjusting a threshold score (security level) and determine that authentication is successful. In other words, when reference data of a plurality of users corresponds to obtained authentication data, the authentication device may calculate an authentication score of an authentication target to be higher than that of a case where reference data of a single user corresponds to the authentication data, thereby determining that no additional authentication is necessary or authentication is successful.

In operation 804, the authentication device may maintain a threshold score.

According to some embodiments, the authentication device may maintain a security level when authentication data does not correspond to reference data of a plurality of user. Of course, the authentication device may not add an additional score to an authentication score when the authentication data does not correspond to reference data of the plurality of users.

Figure 9:
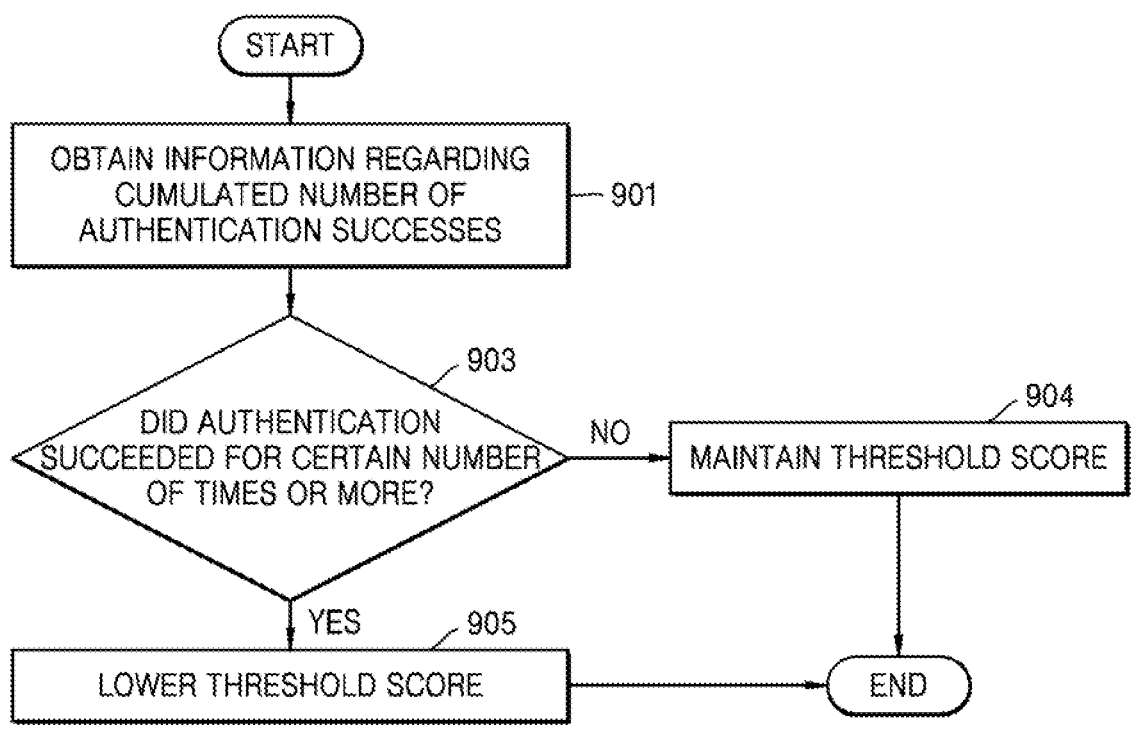
FIG. 9 is a flowchart of a method for determining a threshold score according to the cumulative number of authentication successes, according to some embodiments.

FIG. 9 is a flowchart of a method for determining a threshold score according to the cumulative number of authentication successes according to some embodiments.

In operation 901, an authentication device may obtain information regarding the cumulative number of authentication successes.

According to some embodiments, the authentication device may receive an authentication request and obtain information regarding the cumulative number of authentication successes regarding an authentication target. For example, the authentication device may obtain information regarding the cumulative number of authentication successes regarding a first user.

Furthermore, according to some embodiments, the authentication device may obtain the information regarding the cumulative number of authentication successes stored in the authentication device or obtain information regarding the cumulative number of authentication successes from at least one other external device or an external server. The information regarding the cumulative number of authentication successes may include the number of times authentication has succeeded within a predetermined period of time or a ratio of the number authentication attempts within a predetermined period to the number of authentication successes.

In operation 903, the authentication device may determine whether the number of authentication successes is equal to or greater than a predetermined number.

Furthermore, according to some embodiments, not only the number of authentication successes, but also time points at which authentications are performed may be considered.

In operation 905, the authentication device may lower a threshold score. For example, for a user corresponding to 30 or more authentication successes, authentication may be skipped for the user or may be simplified by performing at least one of a plurality of authentication methods for the user. Alternatively, the authentication device may perform authentication for 30 times or more at 8:00 PM and determine a user corresponding to 29 or more authentication successes is successfully authenticated.

Furthermore, according to some embodiments, the authentication device may add an additional score to a calculated authentication score without adjusting a threshold score, thereby determining that authentication is successful without performing an additional authentication method.

In operation 904, the authentication device may maintain the threshold score. Furthermore, the authentication device may not add an additional score to the authentication score. This corresponds to the description given above with reference to FIG. 8.

FIG. 10 is a diagram showing reliability according to types of authentication data, the reliability used for calculating an authentication score according to some embodiments. According to some embodiments, an authentication device may obtain authentication data and calculate an authentication score based on reliability information that is assigned to the type of the authentication data in advance.

Referring to FIG. 10, types of authentication data may be categorized into image, voice, body weight, iris, fingerprint, automobile authentication result, entrance door-lock authentication result, PC login information, and user recognition pattern information. Of course, the present invention is not limited thereto, and authentication data may include various types.

According to some embodiments, authentication data may have different reliability information depending on types of the authentication data. For example, from among images, iris data may have higher reliability than fingerprint data, and voice data may have higher reliability than body weight data. Since authentication results are also included in authentication data, the authentication results may also have corresponding reliability information, respectively. Of course, the present invention is not limited thereto.

According to some embodiments, reliability information, which is information regarding reliability of authentication data, may be included in an authentication policy. The authentication device may obtain an authentication policy from an external device or an external server or may generate and set an authentication policy based on a user input. The authentication device may also store reliability information in the form of a table.

Figure 11:
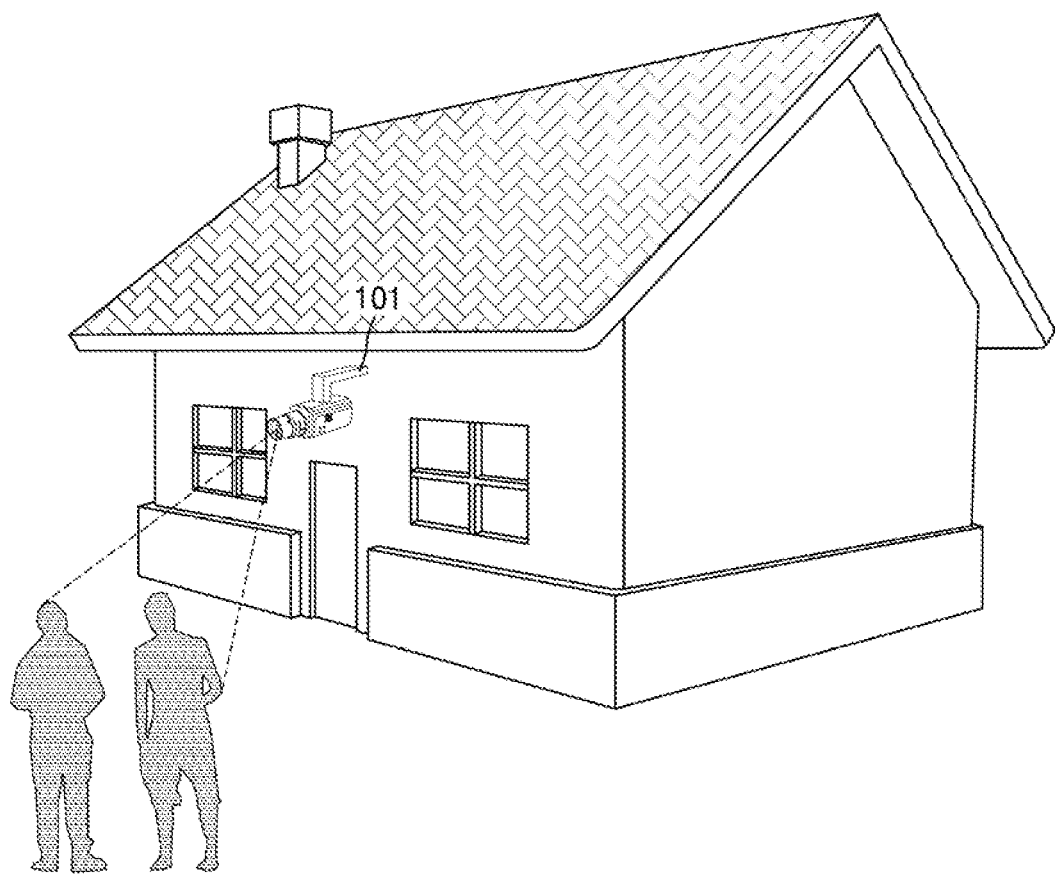
FIGS. 11 and 12 are diagrams showing a method by which an authentication device analyzes authentication data, according to some embodiments.
Figure 12:
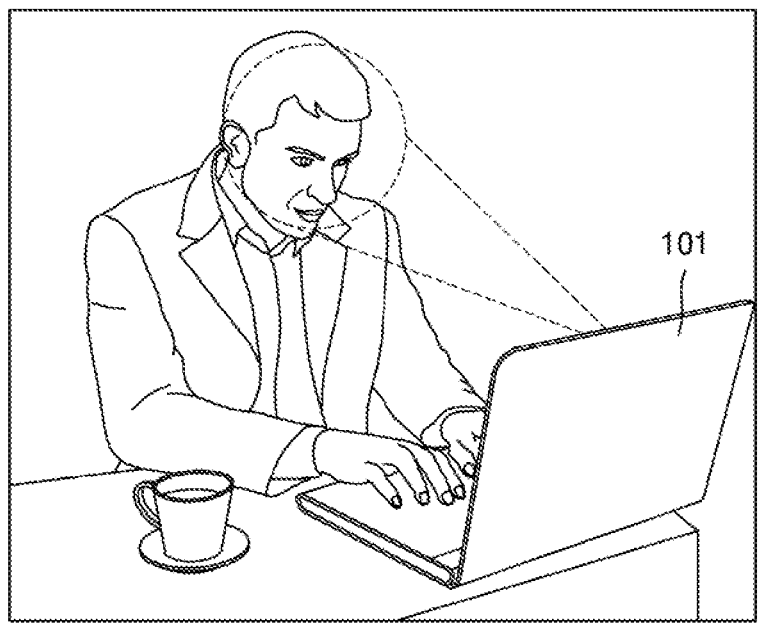

FIGS. 11 and 12 are diagrams showing a method by which an authentication device analyzes authentication data according to some embodiments.

FIG. 11 shows an authentication system in which an authentication device 1010 determines whether it is necessary to perform an additional authentication method by analyzing authentication data when the authentication data includes data for a plurality of users.

As described above, the authentication device 101 may receive an authentication request, obtain authentication data, and analyze the obtained authentication data. The authentication device 101 may adjust a threshold score or adjust calculation of an authentication score, based on a result of the analysis. Furthermore, the authentication device 101 may determine a authentication method based on a result of the analysis of the authentication data.

Referring to FIG. 11, the authentication device 101 obtains authentication data. In FIG. 11, the authentication device may directly obtain authentication data for authenticating a user located at a predetermined location. The user is located at a predetermined position, thereby requesting authentication to the authentication device.

The authentication device 101 may analyze the obtained authentication data. The authentication device 101 may determine whether the authentication data corresponds to reference data of a plurality of users by analyzing the obtained authentication data. For example, when the authentication data is an image, the authentication device 101 may determine whether images of two users included in the image correspond to stored reference data, respectively.

Based on a result of the determination, the authentication device 101 may adjust a security level by adjusting a threshold score or adjust a calculation of an authentication score.

For example, when the obtained authentication data is image data, the authentication data may analyze the image data and determine whether the image data includes data related to a plurality of users. Based on a result of the determination, the authentication device may determine whether the obtained authentication data corresponds to reference data of a plurality of users by comparing the obtained authentication data with stored reference data regarding a single user or the plurality of users. When it is determined that the obtained authentication data corresponds to reference data of the plurality of users, the authentication device may lower the threshold score or add an additional score to the authentication score.

The authentication device may also determine whether it is necessary to perform an additional authentication method based on the determined threshold score or authentication score. For example, when it is determined that authentication is not successfully even after the threshold score is lowered or additional authentication score is added to the authentication score, the authentication device may determine that it is necessary to perform an additional authentication method. Of course, when it is determined that authentication is successful after the authentication score is lowered or an additional score is added to the authentication score, the authentication device may determine that the it is not necessary to perform an additional authentication method. FIG. 12 shows a system in which the authentication device 1010 provides the number of times for accepting authentication requests by analyzing authentication data.

According to some embodiments, when authentication fails for a predetermined number of times or more, the authentication device 101 may not perform authentication for a predetermined period of time or may stop a service being provided. Of course, the present invention is not limited thereto.

According to some embodiments, the authentication device 101 may adjust the number of times for accepting authentication requests by analyzing authentication data. When an authentication score is less than or equal to a threshold score but is equal to or greater than a predetermined score, the authentication device 101 may guarantee a predetermined number of times for accepting authentication requests or more to a user.

Referring to FIG. 12, the authentication device 101 obtains authentication data directly. When the authentication device 101 determines that a user is a predetermined user as a result of analyzing the authentication data and the user inputs an ID and a password for an online transaction, the authentication device 101 may allow the user to re-input an ID and a password for a predetermined number of times or more even when the user inputs the ID and the password incorrectly. Furthermore, the authentication device 101 may not be configured to not to receive an ID and a password for a certain period of time.

Figure 13:
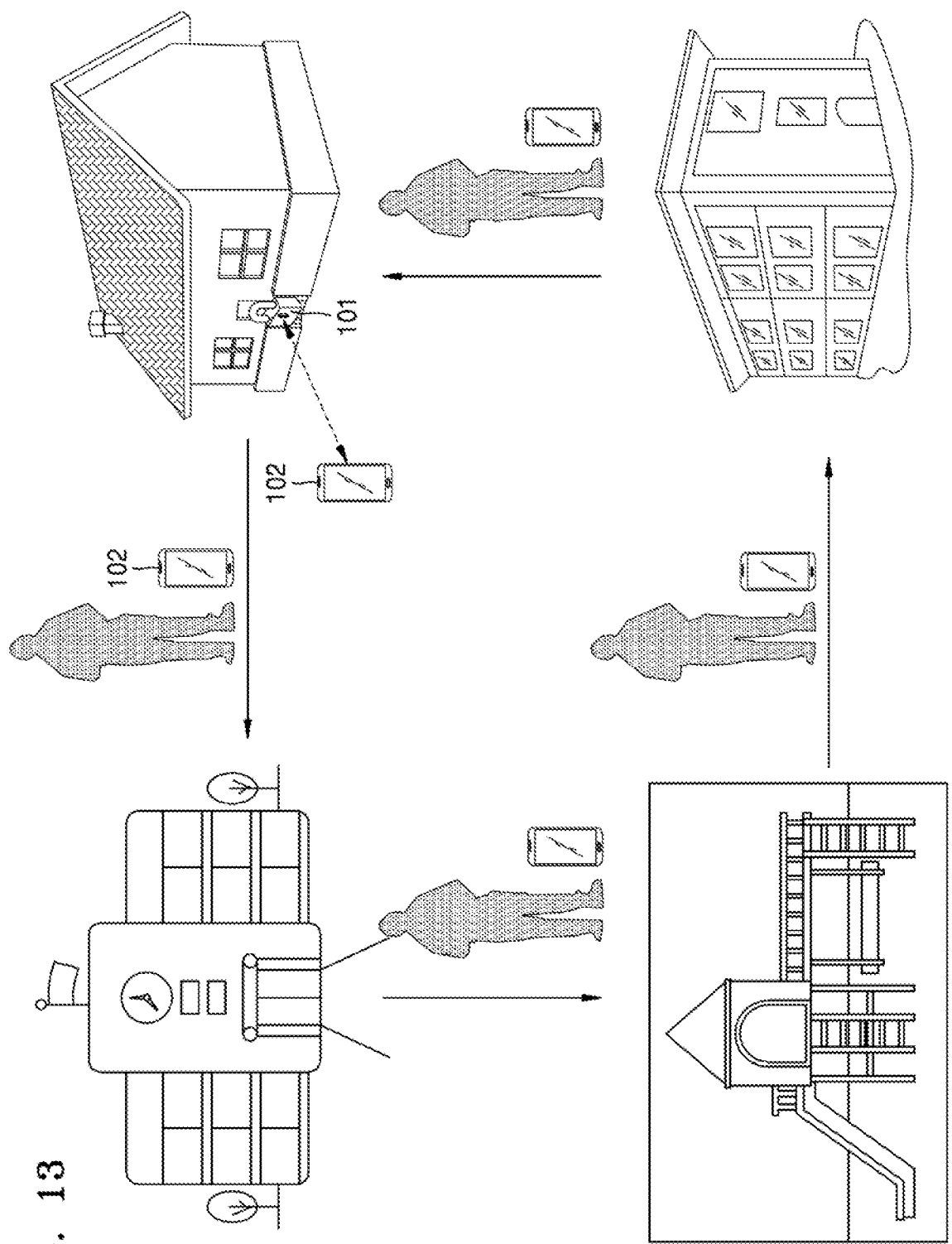
FIG. 13 is a diagram showing an authentication method based on recognition pattern information, according to some embodiments.

FIG. 13 is a diagram showing an authentication method based on recognition pattern information according to some embodiments.

According to some embodiments, authentication data may include recognition pattern information. The term "recognition pattern information" refers to predetermined pattern information for identifying an authentication target and may refer to information obtained by periodically or repeatedly obtaining information regarding the authentication target and analyzing and patternizing the obtained information regarding the authentication target. For example, the recognition pattern information may include a location of a user, a pattern of altitude changes, and a pattern of using a device held by the user. Of course, the present invention is not limited thereto.

According to some embodiments, an external device 102 may generate recognition pattern information regarding a user. In other words, the external device 102 may generate recognition pattern information regarding the user by collecting information regarding the user. Furthermore, the external device 102 may transmit information regarding the user to an external server, and the external server may collect information regarding the user and generate recognition pattern information.

According to some embodiments, the authentication device 102 may receive recognition pattern information from an external device and store the recognition pattern information as reference data. Of course, the authentication device 102 may also receive recognition pattern information from an external server.

Referring to FIG. 13, the authentication device 102, such as a mobile phone shown in FIG. 13, which is an external device, may obtain recognition pattern information regarding a user, because the user is always carrying the mobile phone 102. The user moves from home to a school, from the school to a park, from the park to a library, and from the library back to the home. When the user always moves in the same order of home→school→park→library→home at predetermined times, information regarding location changes of the user may be generated as recognition pattern information.

For example, it is assumed that, on Monday, the user always leaves home and moves to the school at 9 AM, moves from the school to the park at 5 PM, moves from the part to the library at 6 PM, and moves from the library to home at 8 PM. When the user returns to home at 8 PM on Monday, the authentication device 101 may obtain information regarding a route that the user has traveled today from the mobile phone 102 and, when the obtained information corresponds to recognition pattern information stored as reference data, the authentication device 101 may skip authentication or determine a authentication method to perform only minimum authentication.

Figure 14:
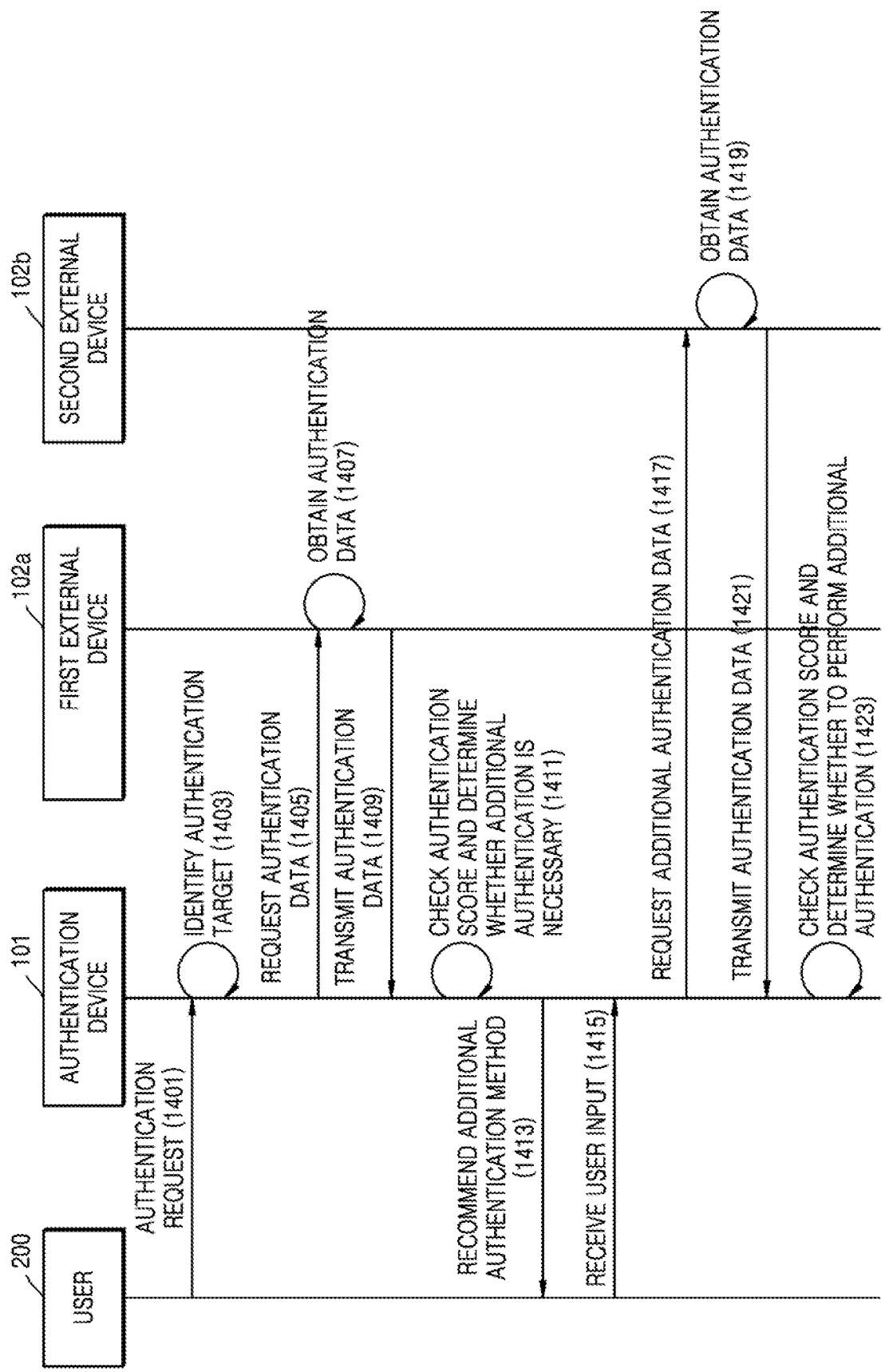
FIG. 14 is a flowchart of an authentication method according to some embodiments.

FIG. 14 is a flowchart of an authentication method according to some embodiments.

In operation 1401, the authentication device 101 may receive an authentication request from a user. According to some embodiments, the authentication device 101 may receive an authentication request based on a user input. Furthermore, the authentication device 101 may detect that a user is located at a predetermined location, thereby considering that an authentication request is received. Furthermore, the authentication device 101 may detect that a user is located at a predetermined location for a predetermined period of time, thereby considering that an authentication request is received. Of course, the present invention is not limited thereto.

Furthermore, according to some embodiments, the authentication device 101 may receive an authentication request from at least one of external device 102a or 102b. The at least one external device 102a or 102b may also receive an authentication request from a user in the same or similar manner as the authentication device 101. Furthermore, as described above, the authentication device 101 may directly receive an authentication request or obtain authentication data without the at least one external device 102a or 102b.

In operation 1403, the authentication device 101 may identify an authentication target. According to some embodiments, the authentication device 101 may identify an authentication target based on data for identifying the authentication target. However, according to embodiments, the operation 1403 may be omitted. In other words, the authentication device 101 may obtain authentication data without performing operations for identifying an authentication target and identify the authentication target based on the obtained authentication data.

In operation 1405, the authentication device 101 may request authentication data to a first external device 102a. Furthermore, according to some embodiments, the authentication device 101 may directly obtain authentication data.

According to some embodiments, the authentication device 101 may provide identification information regarding an authentication target obtained together with an authentication request to the first external device 102a.

In operation 1407, the first external device 102a may obtain authentication data. According to some embodiments, the first external device 102a may obtain authentication data based on a user input. For example, the first external device 102a may notify a user that it is necessary to input authentication data and obtain authentication data based on a user input.

Furthermore, the first external device 102a may obtain authentication data automatically without a user input. For example, a camera may automatically obtain an image of a user located at a predetermined location without a user input.

Furthermore, according to some embodiments, the authentication device 101 may obtain authentication data in the same or similar manner as the first external device 102a.

In operation 1409, the first external device 102a may transmit authentication data to the authentication device 101. According to some embodiments, the first external device 102a may also transmit information for identifying an authentication target with the authentication data.

In operation 1411, the authentication device 101 may obtain an authentication score and determine whether to perform additional authentication. As described above, the authentication device 101 may obtain an authentication score based on reliability information, which is information regarding reliability assigned to the type of the authentication data in advance, compare the obtained authentication score with a threshold score, and determine whether to perform additional authentication.

According to some embodiments, when it is necessary to perform additional authentication, the authentication device 101 may determine an additional authentication method. The authentication device 101 may determine an additional authentication method by taking at least one of a user input, a distance to a user, pre-set preferences of the user, a frequency of using an external device, and the type of authentication data that may be obtained from the external device into account. According to some embodiments, the determination of an additional authentication method may additionally include determination of the type of authentication data to be additionally obtained and determination of an order to obtain the authentication data.

In operation 1413, the authentication device 101 may recommend an additional authentication method to the user. According to some embodiments, the authentication device

101 may determine at least one additional authentication method and recommend the at least one additional authentication method to the user.

In operation 1415, the authentication device 101 may receive a user input. The authentication device 101 may change the additional authentication method or select one of a plurality of additional authentication methods based on the user input.

For example, when a camera is selected based on a user input, the authentication device 101 may determine an additional authentication method using at least one external device including the camera. Of course, the present invention is not limited thereto.

In operation 1417, the authentication device 101 may request additional authentication data. According to some embodiments, the authentication device 101 may request additional authentication data to at least one second external device 102b determined in the operation 1415 based on a user input.

According to some embodiments, the authentication device 101 may also directly obtain additional authentication data.

In operation 1419, the second external device 102b may obtain authentication data. This corresponds to the operation 1417 in which the first external device 102a obtains the authentication data.

In operation 1421, the second external device 102b may transmit authentication data to the authentication device 101.

In operation 1423, the authentication device 101 may check an authentication score and determine whether to perform additional authentication. According to some embodiments, the authentication device 101 may obtain an authentication score based on the obtained additional authentication data, compare the authentication score to a threshold score, and determine whether it is necessary perform additional authentication or whether authentication is successful. When it is necessary to perform additional authentication, the authentication device 101 may sequentially perform authentication from the operation 1413 again. However, when it is determined that it is necessary to perform additional authentication for a predetermined number of times or more, the authentication device 101 may determine that the authentication has failed.

According to some embodiments, the authentication device 101 may not perform authentication for a predetermined period of time when it is determined that authentication has failed. Of course, the present invention is not limited thereto, and the authentication device 101 may perform a separate procedure associated with authentication failure according to an authentication policy obtained by the authentication device 101.

Figure 15:
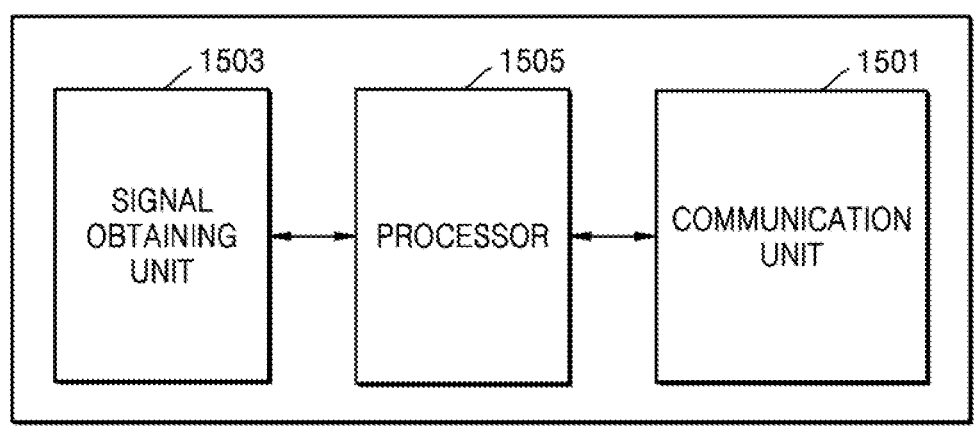
FIGS. 15 through 16 are block diagrams for describing an authentication device according to some embodiments.
Figure 16:
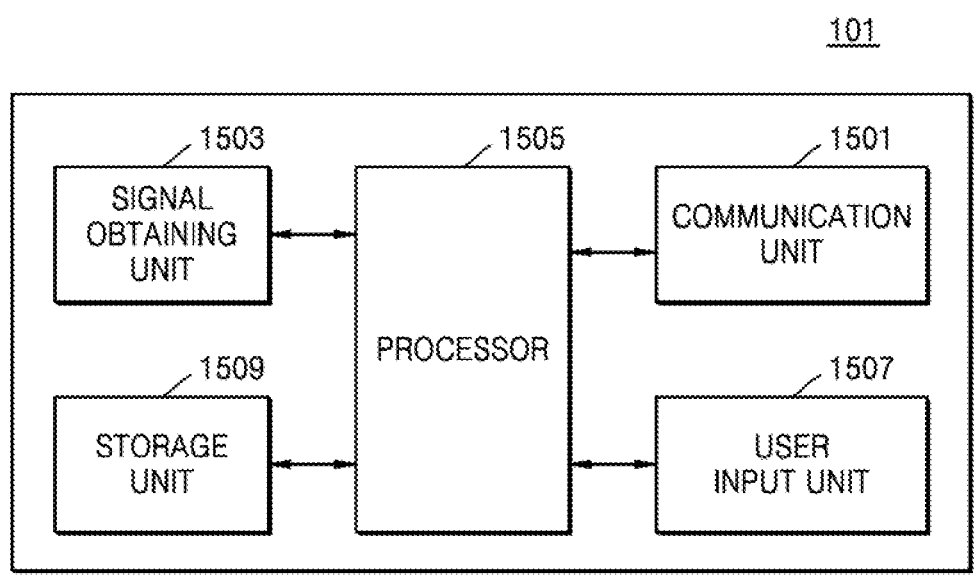

FIGS. 15 through 16 are block diagrams for describing an authentication device according to some embodiments.

As shown in FIG. 15, the authentication device 101 according to some embodiments may include a communication unit 1501, a signal obtaining unit 1503, and a processor 1505. However, not all of the components shown in FIG. 15 are essential components of the authentication device 101. The authentication device 101 may be implemented by more components than the components shown in FIG. 15 or may be implemented by fewer components than the components shown in FIG.

Furthermore, according to some embodiments, the external devices 102a through 102h described above may also include the same configuration as the authentication device 101. The external server 110 may also include the same configuration as the authentication device 101. In other words, according to some embodiments, the authentication device 101, the external device 102a through 102h, and the external server 110 may perform the same role.

Furthermore, according to some embodiments, the authentication device 101 may be an independent device or a device included in a predetermined apparatus.

According to some embodiments, the communication unit 1501 may obtain authentication data for authenticating a user from at least one of a plurality of external devices. The communication unit 1501 may also receive information regarding an authentication result from at least one of the plurality of external devices. Furthermore, according to some embodiments, the communication unit 1501 may receive authentication data or information regarding an authentication result from an external server.

According to some embodiments, the communication unit 1501 may transmit information regarding an authentication result information or authentication data to an external device or an external server or may receive an authentication request.

Furthermore, according to some embodiments, the communication unit 1501 may request additional authentication data to at least one external device or an external server selected based on a determined additional authentication method and obtain additional authentication data in response to the request. The communication unit 1501 may also transmit additional authentication data to an external server or at least one external device.

According to some embodiments, the communication unit 1501 may transmit or receive data for identifying an authentication target to at least one external device or an external server. The communication unit 1501 may also obtain reference data from at least one device, an external server, or a user.

According to some embodiments, the signal obtaining unit 1503 may receive an authentication request. According to some embodiments, the signal obtaining unit 1503 may determine that an authentication request is received as a predetermined signal is obtained. For example, the signal obtaining unit 1503 may determine that a predetermined signal is obtained based on a user input or may determine that a predetermined signal is obtained by detecting a position of a user or a distance to the user.

Additionally, according to some embodiments, the signal obtaining unit 1503 may include a sensor. Furthermore, according to some embodiments, the signal obtaining unit 1503 may include an A/V input unit, such as a camera or a sound input unit.

The processor 1505 typically controls the overall operation of the authentication device 101. For example, the processor 1505 may control the overall operations of the components included in the authentication device 101 by executing a program stored in the authentication device 101. Furthermore, the processor 1505 may include at least one processor.

According to some embodiments, the processor 1505 may obtain an authentication score based on obtained authentication data and reliability information, which is information regarding reliability assigned to the type of the obtained authentication data in advance. Furthermore, the processor 1505 may determine whether it is necessary to perform additional authentication according to the obtained authentication score. Furthermore, the processor 1505 may obtain an authentication score by using information regarding an authentication result obtained by the communication unit 1501.

According to some embodiments, the processor 1505 may determine an authentication method for additional authentication when an authentication score is less than or equal to a threshold score. The processor 1505 may determine the threshold score based on at least one of the number of received authentication requests, a result of analyzing authentication data, the number of external devices connected to the authentication device 101, and the cumulative number of authentication successes. The processor 1505 may also control the communication unit 1501 to request authentication data for a predetermined number of times or more when the obtained authentication score is a predetermined score less than or equal to the threshold score.

According to some embodiments, the processor 1505 may determine at least one external device to use for additional authentication based on a distance to a user, a pre-set preference of the user, a frequency of using the external device, and reliability information assigned to the type of authentication data that may be obtained from the external device.

According to some embodiments, the processor 1505 may determine an additional authentication method. The determination of an additional authentication method may additionally include determination of the type of authentication data to be obtained by using at least one external device and determination of an order to obtain the authentication data.

According to some embodiments, the processor 1505 may compare reference data with authentication data, and calculate an authentication score based on a result of the comparison.

According to some embodiments, the processor 1505 may determine whether additional reference data is needed and update stored reference data by using obtained authentication data. According to some embodiments, the processor 1505 may compare obtained authentication data with stored reference data when an authentication score is equal to or greater than a threshold score and selectively update the reference data with the obtained authentication data based on a result of the comparison.

According to some embodiments, an external device may include both a device that collects information and a device capable of performing authentication, and an external device may be a concept that includes an external server.

FIG. 16 is a block diagram showing the authentication device 101 according to some embodiments. As shown in FIG. 16, the authentication device 101 according to some embodiments may include the communication unit 1501, the signal obtaining unit 1503, the processor 1505, a user input unit 1507, and a storage unit 1509. However, not all of the components shown in FIG. 16 are essential components of the authentication device 101. The authentication device 101 may be implemented by more components than the components shown in FIG. 16 or may be implemented by fewer components than the components shown in FIG. 16.

According to some embodiments, operations of the communication unit 1501, the signal obtaining unit 1503, and the processor 1505 correspond to those described above with reference to FIG. 15. Therefore, detailed description thereof will be omitted.

According to some embodiments, the user input unit 1507 may obtain reference data from a user. According to some embodiments, the user input unit 1507 may obtain reference data based on a user input or obtain reference data based on a control of the processor 1505 without a user input.

Furthermore, according to some embodiments, the user input unit 1507 may receive a user input for selecting an authentication method or at least one external device or may receive information or data for identifying a user.

According to some embodiments, the storage unit 1509 may store reference data. The storage unit 1509 may update the stored reference data based on a control of the processor 1505. Furthermore, according to some embodiments, the storage unit 1509 may categorize reference data according to authentication targets and manage and store the reference data. For example, the storage unit 1509 may categorize and manage reference data according to respective users.

Figure 17:
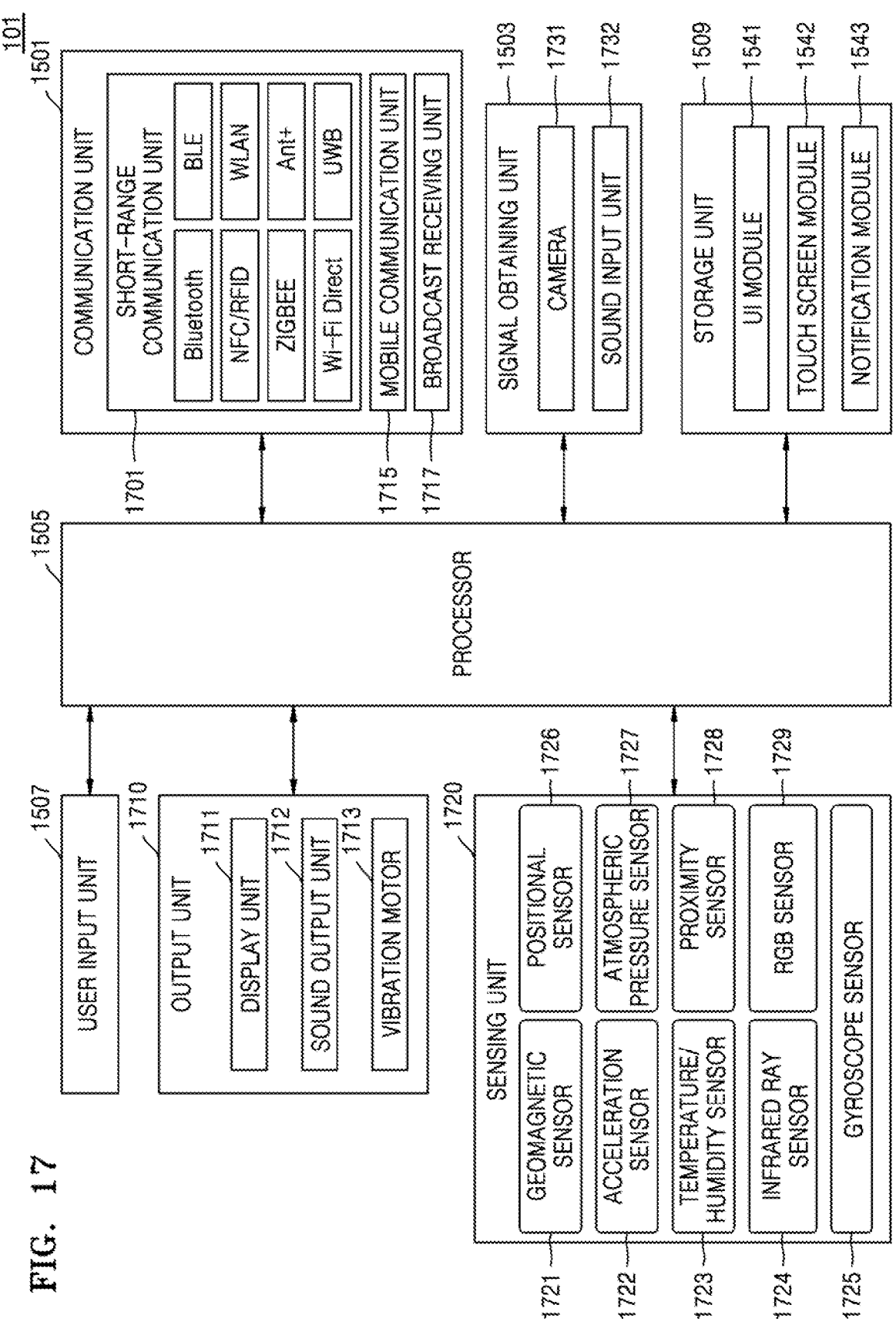
FIG. 17 is a detailed block diagram for describing an authentication device according to some embodiments.

FIG. 17 is a detailed block diagram for describing an authentication device according to some embodiments.

As shown in FIG. 17, the authentication device 101 according to some embodiments may further include an output unit 1710 and a sensor unit 1720 in addition to the communication unit 1501, the signal obtaining unit 1503, the processor 1505, the user input unit 1507, and the storage unit 1504.

The communication unit 1501 may include one or more components that enable communication with at least one external device or an external server. For example, the communication unit 1501 may include a short-range communication unit 1701, a mobile communication unit 1715, and a broadcast receiving unit 1717.

The short-range wireless communicator 1701 may include a bluetooth communicator, a bluetooth low energy (BLE) communicator, a near field communicator, a wireless local area network (WLAN) or Wi-Fi communicator, a Zigbee communicator, an infrared data association (IrDA) communicator, a Wi-Fi Direct (WFD) communicator, an ultra wideband (UWB) communicator, and an Ant+ communicator, but is not limited thereto.

The mobile communicator 1715 may transceive wireless signals to and from at least one of a base station, an external terminal, and a server on a mobile communication network. The wireless signals may include various types of data for transceiving audio call signals, video communication call signals, or text/multimedia messages.

The broadcasting receiver 1717 may receive broadcasting signals and/or information related to broadcasting from the outside via broadcasting channels. The broadcasting channels may include satellite channels and ground wave channels. According to some embodiments, the authentication device 101 may not include the broadcasting receiver 1717.

The communication unit 1501 may transceive authentication data with an external server or an external device. Furthermore, the communication unit 1501 may transceive an authentication request with an external server or an external device. This corresponds to the descriptions given above, and thus detailed description thereof will be omitted.

The storage unit (memory) 1509 may store a program for processing and controlling of the processor 1505 and may also store data input to or output from the authentication device 101.

The storage unit (memory) 1509 may include at least one of a flash memory type memory, a hard disk type memory, a multimedia card micro type memory, a card type memory (e.g., SD memory or XD memory), RAM, static random access memory (SRAM), ROM, electrically erasable-programmable read-only memory (EEPROM), programmable read-only memory (PROM), a magnetic memory, a magnetic disk, and an optical disc.

Programs stored in the storage unit (memory) 1509 may be categorized into a plurality of modules according to their functions, e.g., a UI module 1541, a touch screen module 1542, a notification module 1543, etc. Operations performed by the storage unit (memory) 1509 correspond to those described above, and thus detailed description thereof will be omitted.

The UI module 1541 may provide a specialized UI or a GUI interlocked with the authentication device 101. For example, the UI module 1541 may provide a UI or a GUI for determining whether the authentication device 101 is performing authentication, whether authentication is successful, and whether authentication has failed.

The touch screen module 1542 may sense a touch gesture of a user on a touch screen and may transmit information regarding the touch gesture to the processor 1505. The touch screen module 1542 according to some embodiments may recognize and analyze a touch code. The touch screen module 1542 may also be configured as separate hardware.

Various sensors may be provided in or near the touch screen to sense touch or proximity touch of the touch screen. An example of a sensor for sensing touch of a touch screen includes a tactile sensor. A tactile sensor is a sensor that detects the contact of a specific object to a degree or more that a person feels. The tactile sensor may detect various information, such as the roughness of a contact surface, the rigidity of a contact object, and a temperature of a contact point.

Furthermore, an example of a sensor for sensing a touch of a touch screen includes a proximity sensor.

The proximity sensor refers to a sensor that detects the presence of an object approaching toward a predetermined detection surface or an object existing in the vicinity of the detection surface without a mechanical contact by using the force of an electromagnetic field or infrared rays. Examples of the proximity sensor include a transmissive photoelectric sensor, a direct-reflection type photoelectric sensor, a mirror-reflection type photoelectric sensor, a high-frequency oscillation type proximity sensor, a capacitive proximity sensor, a magnetic proximity sensor, and an infrared proximity sensor.

A user's touch gestures may include tap, touch-and-hold, double tap, drag, pan, flick, drag-and-drop, swipe, etc.

The notification module 1542 may generate a signal for notifying the occurrence of an event of the authentication device 101. Examples of events occurring in the authentication device 101 include message reception, key signal input, content input, content transmission, and detection of content corresponding to a certain condition. The notification module 1542 may output a notification signal in the form of a video signal through a display unit 1711, may output a notification signal in the form of an audio signal through a sound output unit 1712, or may output a notification signal in the form of a vibration signal through a vibration motor 1713.

The processor 1505 typically controls the overall operation of the authentication device 101. For example, the processor 1505 may control the overall operations of the components included in the authentication device 101 by executing a program stored in the authentication device 101. This corresponds to the descriptions given above, and thus detailed description thereof will be omitted.

The input unit 1507 refers to a means by which a user inputs data for controlling the authentication device 101. For example, the input unit 1507 may include a key pad, a dome switch, a touch pad (a contact capacitance type, a pressure resistive type, an infrared ray detection type, a surface acoustic wave conduction type, an integral tension measuring type, a piezo-effect type, etc.), a jog wheel, and a jog switch, but is not limited thereto. Operations performed by the user input unit 1507 correspond to those described above.

The output unit 1710 may output an audio signal, a video signal, or a vibration signal. The output unit 1710 may include the display unit 1711, the sound output unit 1712, and the vibration motor 1713.

The display 1711 displays information processed in the authentication device 101.

Meanwhile, when the display 1711 and the touch pad constitute a touch screen in a layer structure, the display 1711 may be used as an input device in addition to as an output device. The display 1711 may include at least one of a liquid crystal display, a thin film transistor-liquid crystal display, an organic light-emitting diode, a flexible display, a three-dimensional display, and an electrophoretic display. Furthermore, the authentication device 101 may include two or more displays 1711 depending on implementations of the authentication device 101. In this case, the two or more displays 1711 may face each other across a hinge. The display unit 1711 may display an authentication method recommended to a user, authentication success, or authentication failure.

The sound output unit 1712 may output audio data that is received from the communicator 1501 or stored in the storage unit (memory) 1509. Furthermore, the sound output unit 1712 may output an audio signal related to functions processed in the authentication device 101 (e.g., a call signal receiving sound, a message receiving sound, a notification sound, authentication success sound, authentication failure sound, etc.). Such the sound output unit 1712 may include a speaker, a buzzer, etc.

The vibration motor 1713 may output a vibration signal. For example, the vibration motor 1713 may output a vibration signal corresponding to an output of audio data or video data (e.g., a call signal receiving sound, a message receiving sound, authentication success, authentication failure, etc.) Furthermore, the vibration motor 1713 may output a vibration signal when a touch is input onto the touch screen.

The sensing unit 1720 may detect a status of the authentication device 101 or an ambient status of the authentication device 101 and transfer detected information to the processor 1505.

The sensing unit 1720 may include at least one of a geomagnetic sensor 1721, an acceleration sensor 1722, a temperature/humidity sensor 1723, an infrared ray sensor 1724, a gyroscope sensor 1725, a positional sensor 1726 (e.g., a global positioning system (GPS)), an atmospheric pressure sensor 1727, a proximity sensor 1728, and an illuminance sensor 1729, but is not limited thereto. Since functions of the respective sensors may be intuitively inferred by one of ordinary skill in the art, detailed description thereof will be omitted.

According to some embodiments, the sensing unit 1720 may receive an authentication request by using the sensors. In other words, according to embodiments, the signal obtaining unit 1503 may include the sensing unit 1720 or the sensing unit 1720 may include the signal obtaining unit 1503.

The signal obtaining unit (audio/video (AV) input unit) 1503 is a unit for inputting audio signals or video signals and may include a camera 1731 and a sound input unit (microphone) 1732. The camera 1731 may obtain image frames including a still image or a moving picture via an imaging device in a video call mode or an image capturing mode. An image captured by the imaging device may be processed by the processor 1505 or a separate image processor (not shown).

An image frame processed by the camera 1731 may be stored in the storage unit (memory) 1509 or transmitted to an external device through the communication unit 1501. Two or more cameras 1731 may be included according to the configuration of the authentication device 101. Furthermore, the camera 1731 may be provided as a separate external device.

The sound input unit (microphone) 1732 receives an external sound signal and processes the external sound signal into electrical sound data. According to some embodiments, the sound input unit 1732 may be a microphone, but is not limited thereto.

The sound input unit (microphone) 1732 may receive sound signals from an external device, a server, or a user. The sound input unit 1732 may use various noise reduction algorithms to remove noises generated during reception of an external sound signal. Furthermore, the sound input unit 1732 may be provided as a separate external device.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored as program instructions or computer readable codes executable on a processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to one of ordinary skill in the art without departing from the spirit and scope of the present invention.

The invention claimed is:

1. An authentication method comprising:
receiving an authentication request;
obtaining authentication data for authenticating a user from at least one of a plurality of external devices when the authentication request is received;
obtaining an authentication score based on the obtained authentication data and reliability information assigned to a type of the authentication data in advance;
determining an additional authentication method is necessary based on the obtained authentication score being less than or equal to a threshold score;
receiving, via a user interface of a first external device, a user input, wherein the plurality of external devices comprises the first external device, and
determining at least one external device to use for the additional authentication method,
wherein the at least one external device is determined based on the user input.

2. The authentication method of claim 1, further comprising receiving information regarding an authentication result from the at least one of the plurality of external devices,
wherein, in the obtaining of the authentication score, the authentication score is obtained by using the received information regarding the authentication result.

3. The authentication method of claim 1, wherein the determining of the authentication method comprises determining a type of authentication data to obtain by using the at least one external device and an order of obtaining the authentication data.

4. The authentication method of claim 1, further comprising:
requesting the determined external device for additional authentication data; and
obtaining the additional authentication data in response to the requesting.

5. The authentication method of claim 1, further comprising:
obtaining reference data from the user;
storing the obtained reference data;
determining whether additional reference data is necessary; and
obtaining additional reference data from the user based on a result of the determining.

6. The authentication method of claim 1, further comprising updating stored reference data by using the obtained authentication data.

7. The authentication method of claim 6, wherein the updating comprises:
when the authentication score is equal to or greater than a threshold score, comparing the obtained authentication data to the stored reference data; and
selectively updating the stored reference data with the obtained authentication data based on a result of the comparing.

8. The authentication method of claim 1, wherein the authentication data comprises recognition pattern information for identifying the user.

9. The authentication method of claim 1, wherein the threshold score is determined according to at least one of a number of the received authentication requests, a result of analyzing the authentication data, a number of external devices connected to the authentication device, and a cumulative number of authentication successes.

10. The authentication method of claim 1, wherein, in the determining of the authentication method, the authentication method is determined to request at least one external device for authentication data a predetermined number of times or more when the obtained authentication score is a predetermined score less than or equal to the threshold score.

11. The authentication method of claim 1, wherein the user input identifies the at least one external device.

12. The authentication method of claim 1, further comprising displaying a plurality of authentication methods to the user, wherein the user input includes a user selection, the determining at least one external device to use for the additional authentication method comprises receiving the user selection, from among the plurality of authentication methods, of a first authentication method from the user, wherein the first authentication method corresponds to the additional authentication method.

13. The authentication method of claim 12, further comprising determining, based on the user selection, a sequence of a second plurality of external devices to use for the additional authentication method, wherein the plurality of external devices includes the at least one external device.

14. An authentication device comprising:
a sensor and a signal processor, wherein the signal processor is configured to receive an authentication request;
a communication unit configured to obtain authentication data for authenticating a user from at least one of a plurality of external devices when the authentication request is received, wherein the communication unit comprises a transceiver; and
a processor configured to:
obtain an authentication score based on the obtained authentication data and reliability information previously assigned to a type of the authentication data in advance,
determine an additional authentication is necessary based on the obtained authentication score being less than or equal to a threshold score,
receive, via a user interface of a first external device, a user input, wherein the plurality of external devices comprises the first external device, and
determine at least one external device to use for the additional authentication,
wherein the at least one external device is determined based on the user input.

15. The authentication device of claim 14, further comprising:
a user interface configured to obtain reference data from the user; and
a storage unit configured to store the reference data obtained from the user,
wherein the processor is further configured to determine whether it is necessary to store additional reference data.

16. A non-transitory computer readable recording medium having recorded thereon a computer program for implementing a method of:
receiving an authentication request;
obtaining authentication data for authenticating a user from at least one of a plurality of external devices when the authentication request is received;
obtaining an authentication score based on the obtained authentication data and reliability information assigned to a type of the authentication data in advance;
determining an additional authentication is necessary based on the obtained authentication score being less than or equal to a threshold score;
receiving, via a user interface of a first external device, a user input, wherein the plurality of external devices comprises the first external device, and
determining at least one external device to use for the additional authentication,
wherein the at least one external device is determined based on the user input.

* * * * *